Aug. 25, 1953    B. C. COONS    2,649,878
TOMATO PARING AND CORING MACHINE
Filed Oct. 29, 1947    14 Sheets-Sheet 1
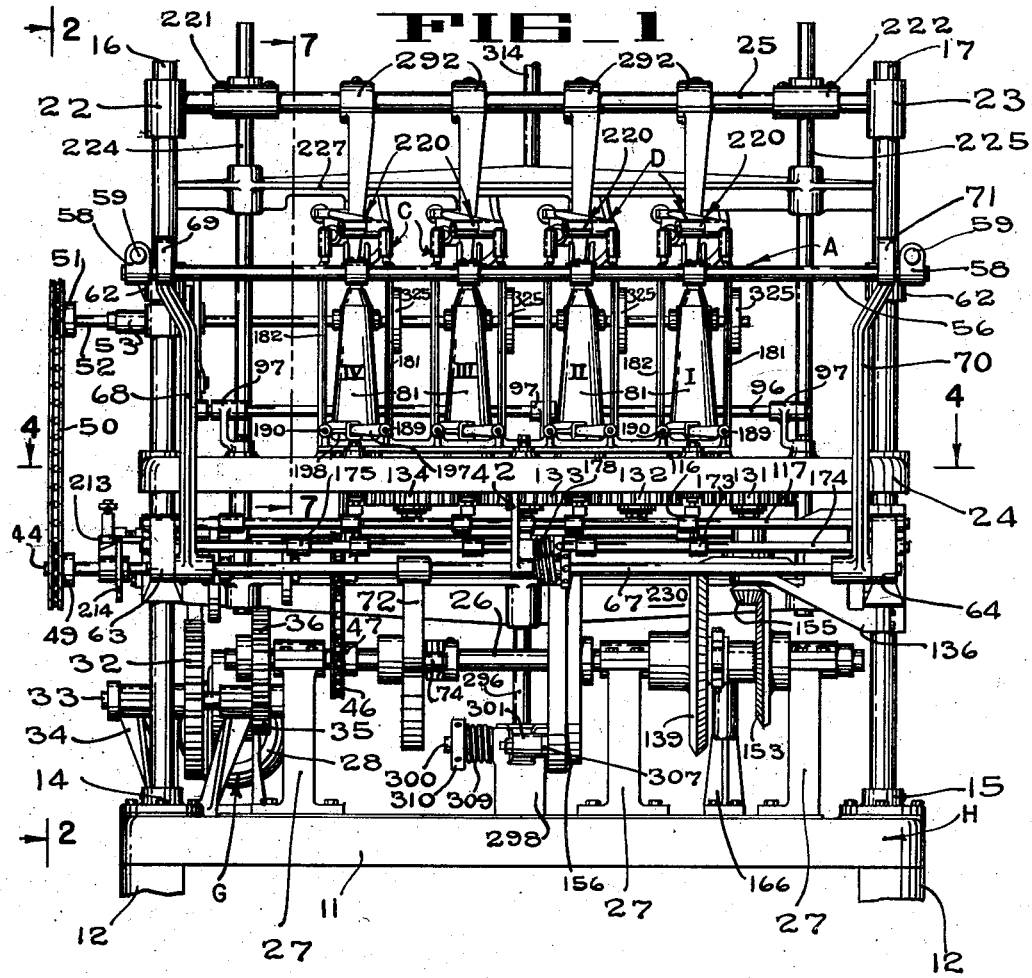
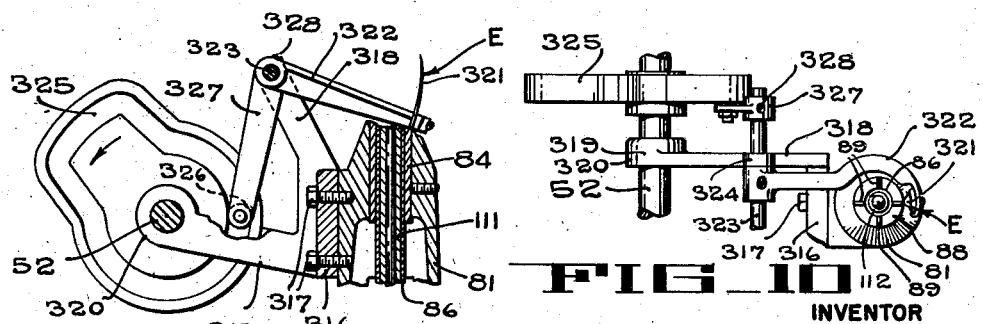
INVENTOR
BURTON C. COONS
BY Philip A. Minnis
Hans G. Hoffmeister
ATTORNEYS

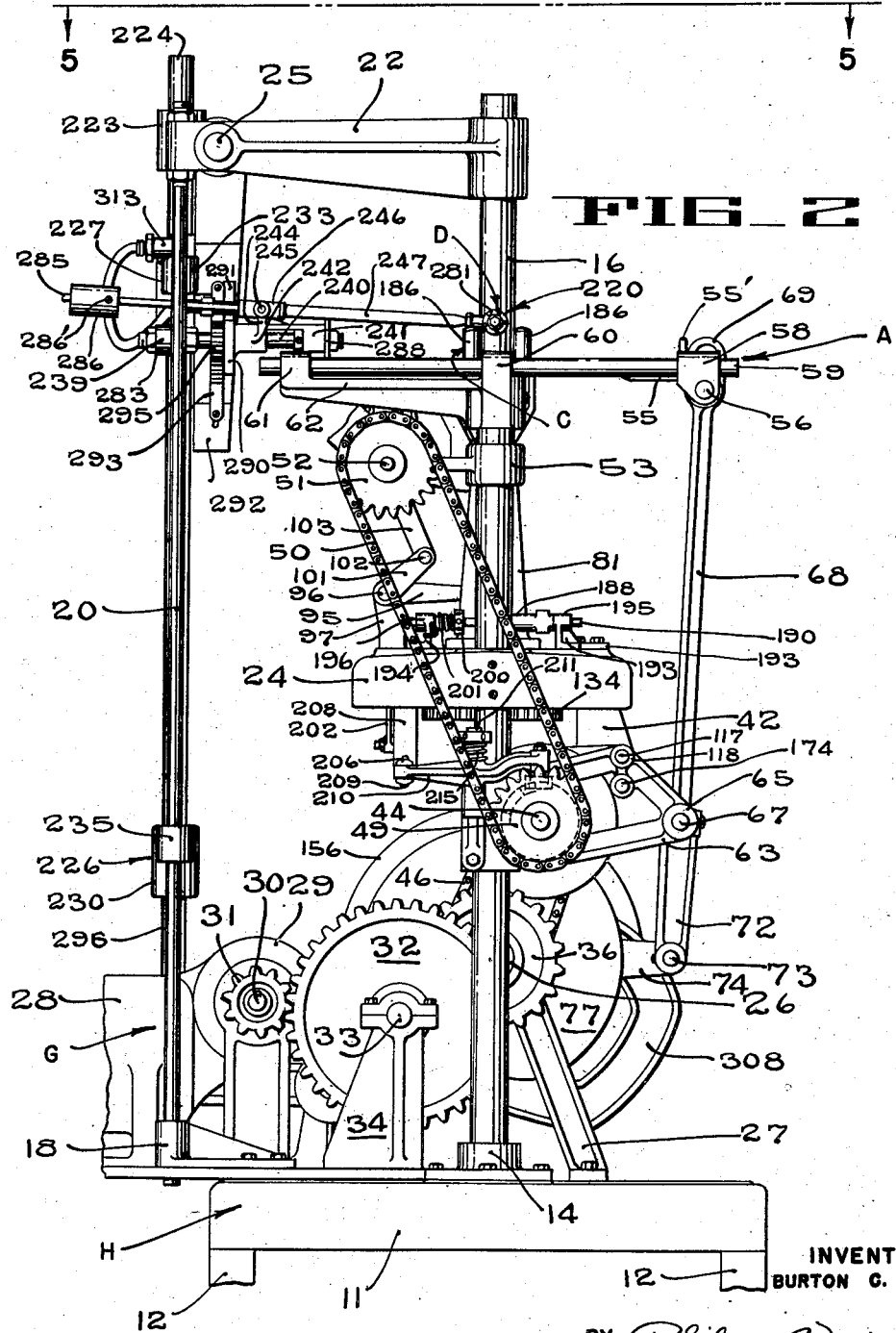

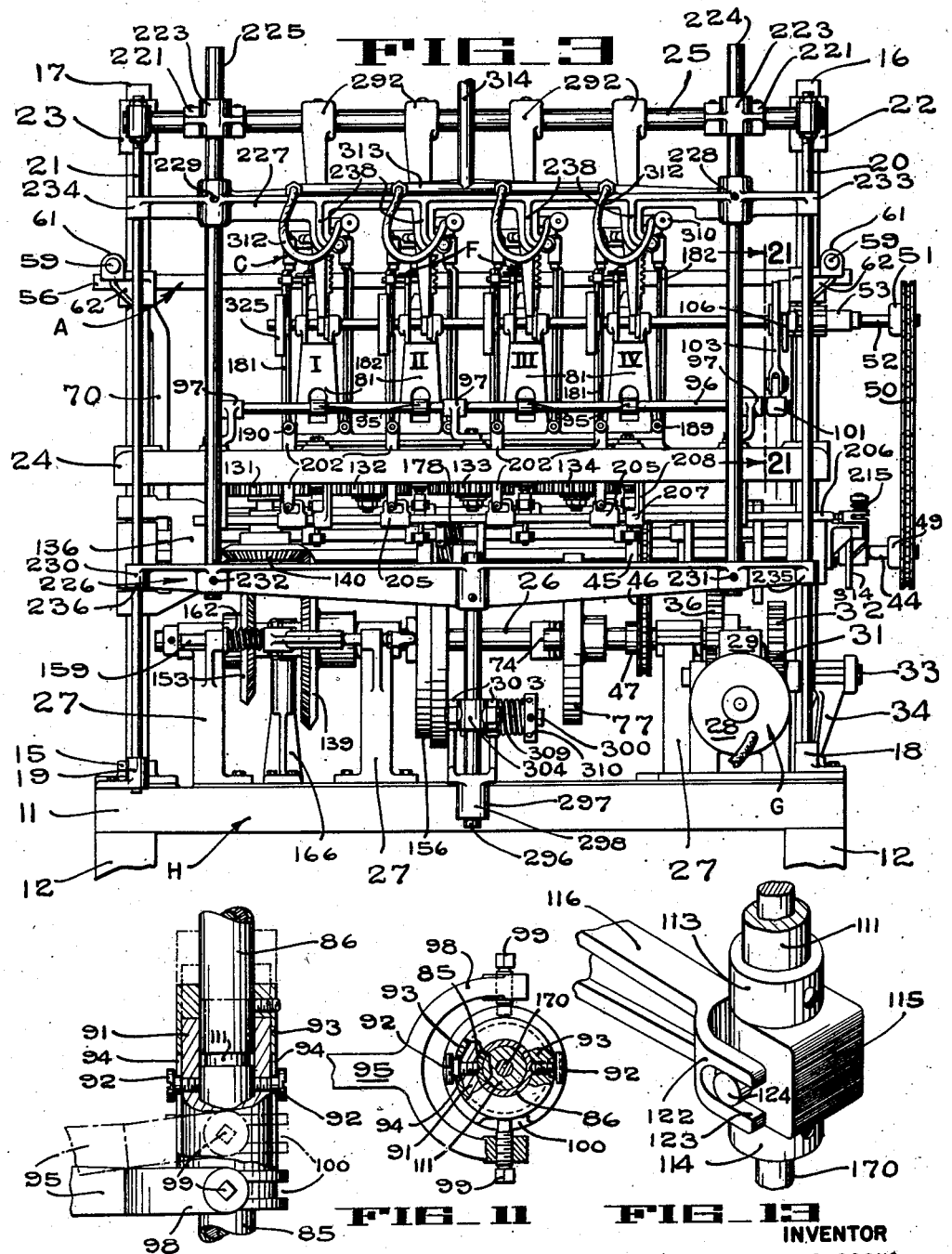

Aug. 25, 1953     B. C. COONS     2,649,878
TOMATO PARING AND CORING MACHINE
Filed Oct. 29, 1947     14 Sheets-Sheet 4

INVENTOR
BURTON C. COONS
BY
ATTORNEYS

Aug. 25, 1953  B. C. COONS  2,649,878
TOMATO PARING AND CORING MACHINE
Filed Oct. 29, 1947  14 Sheets-Sheet 5
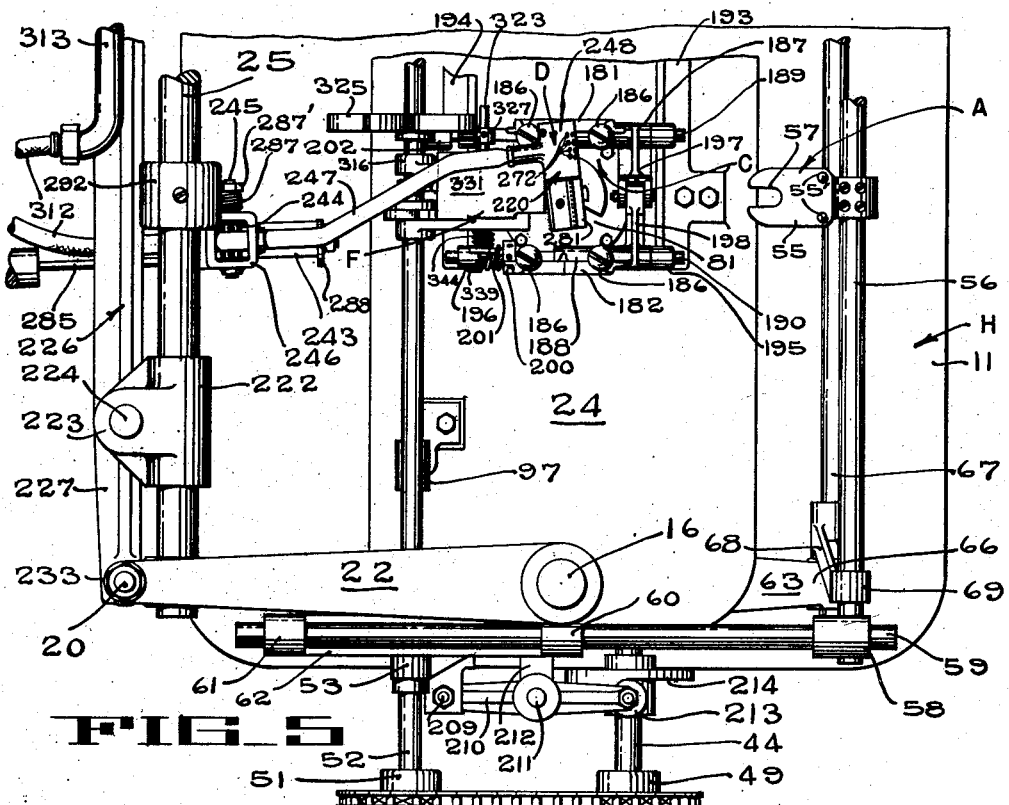
FIG_5
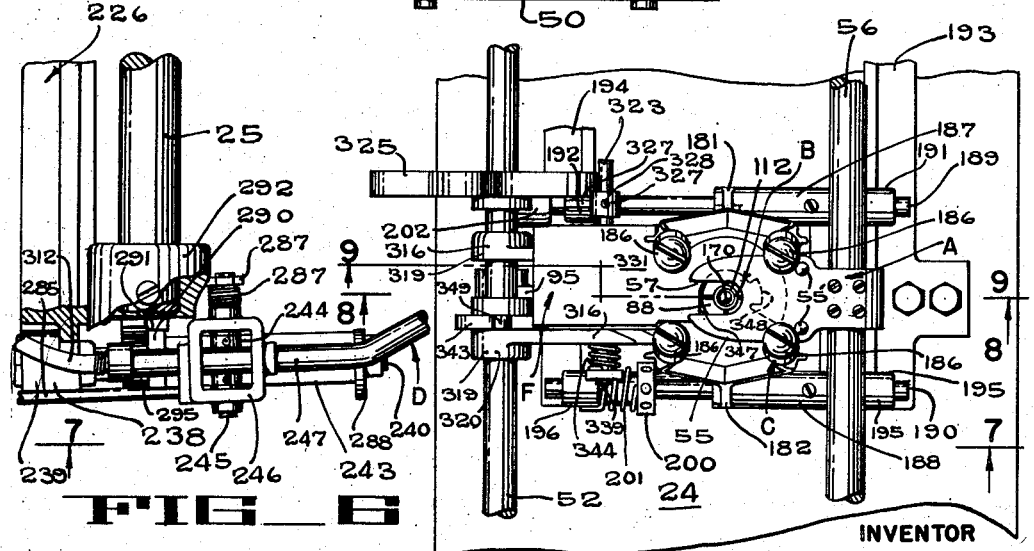
FIG_6
INVENTOR
BURTON C. COONS
ATTORNEYS

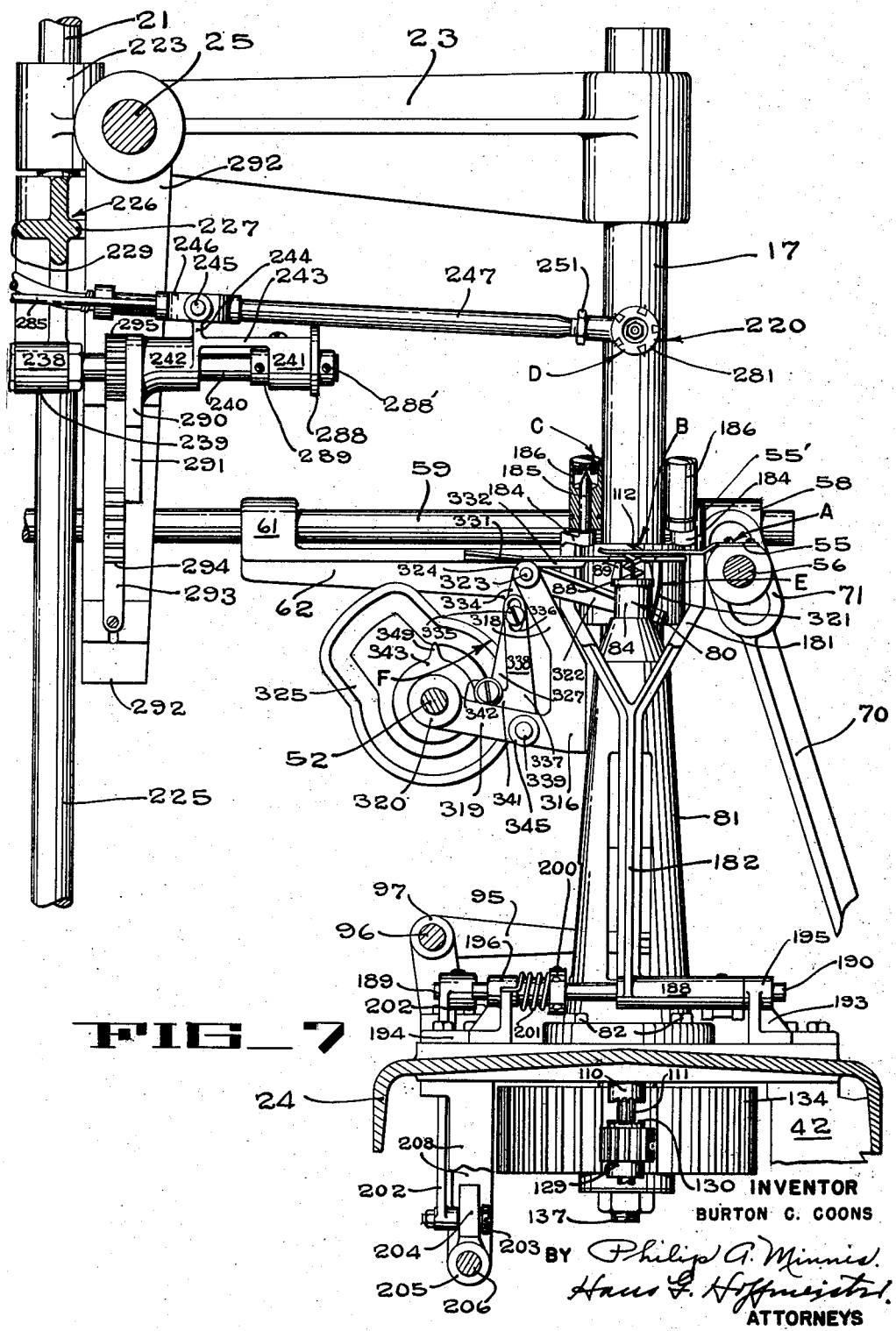

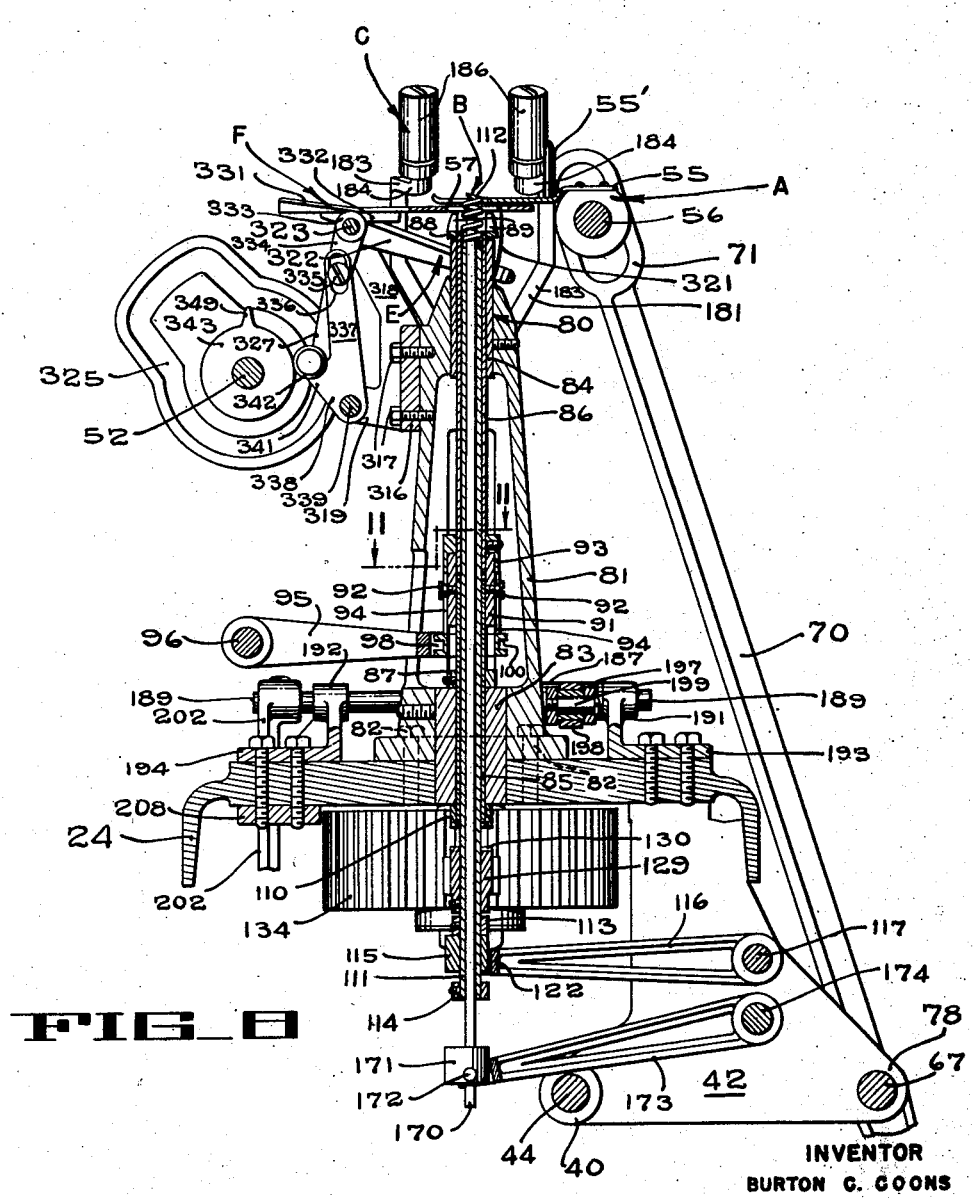

Aug. 25, 1953  B. C. COONS  2,649,878
TOMATO PARING AND CORING MACHINE
Filed Oct. 29, 1947  14 Sheets-Sheet 8
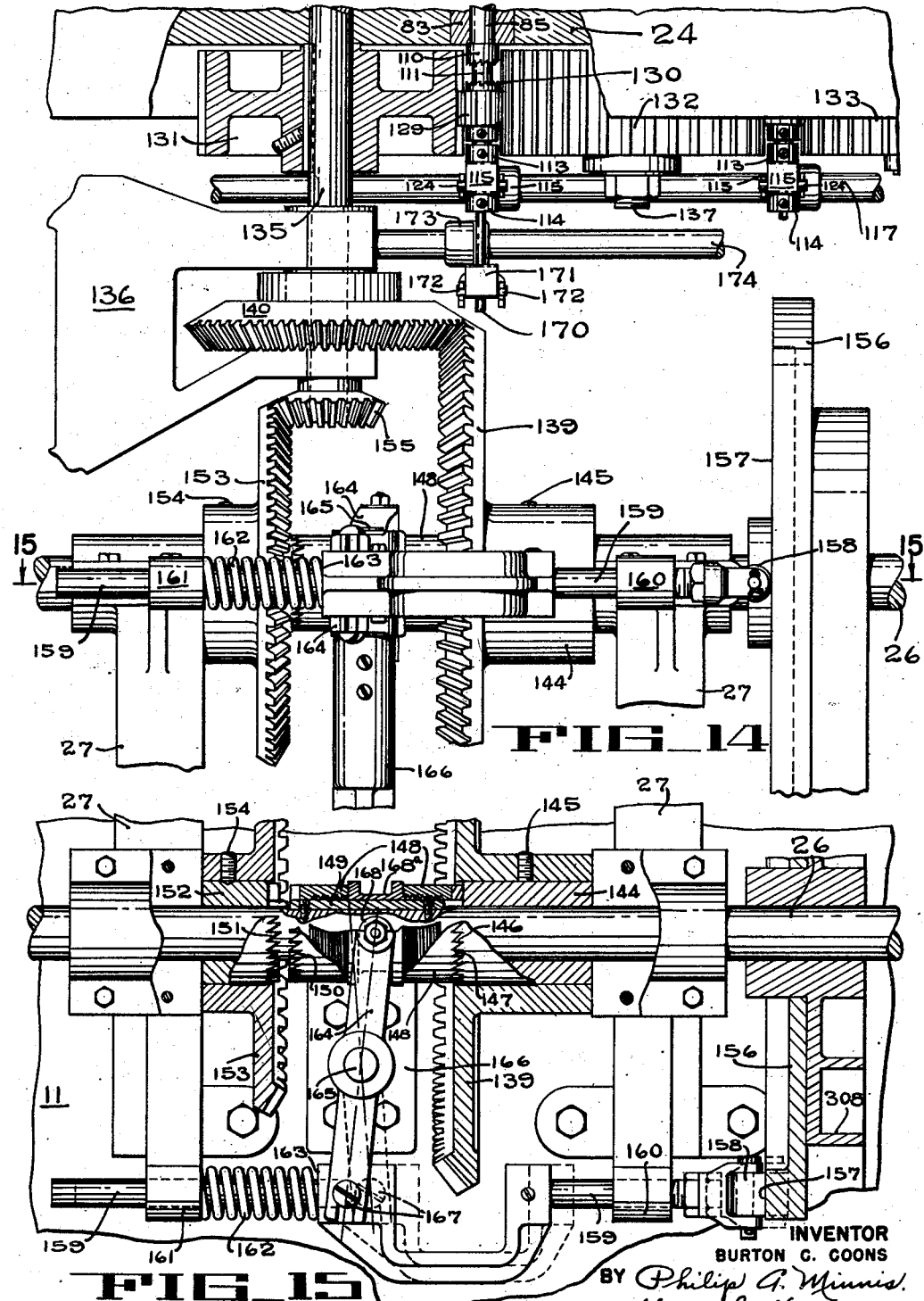

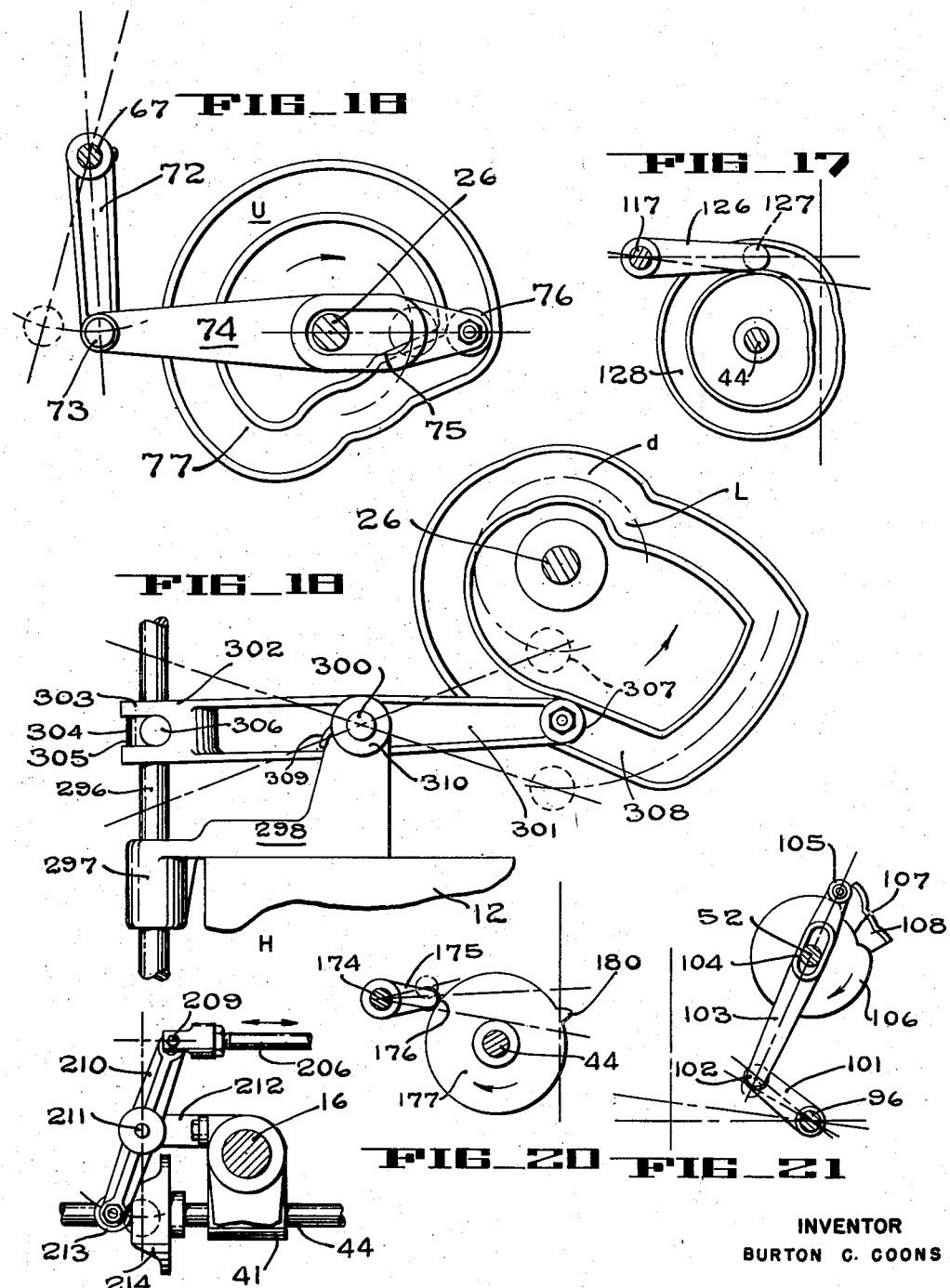

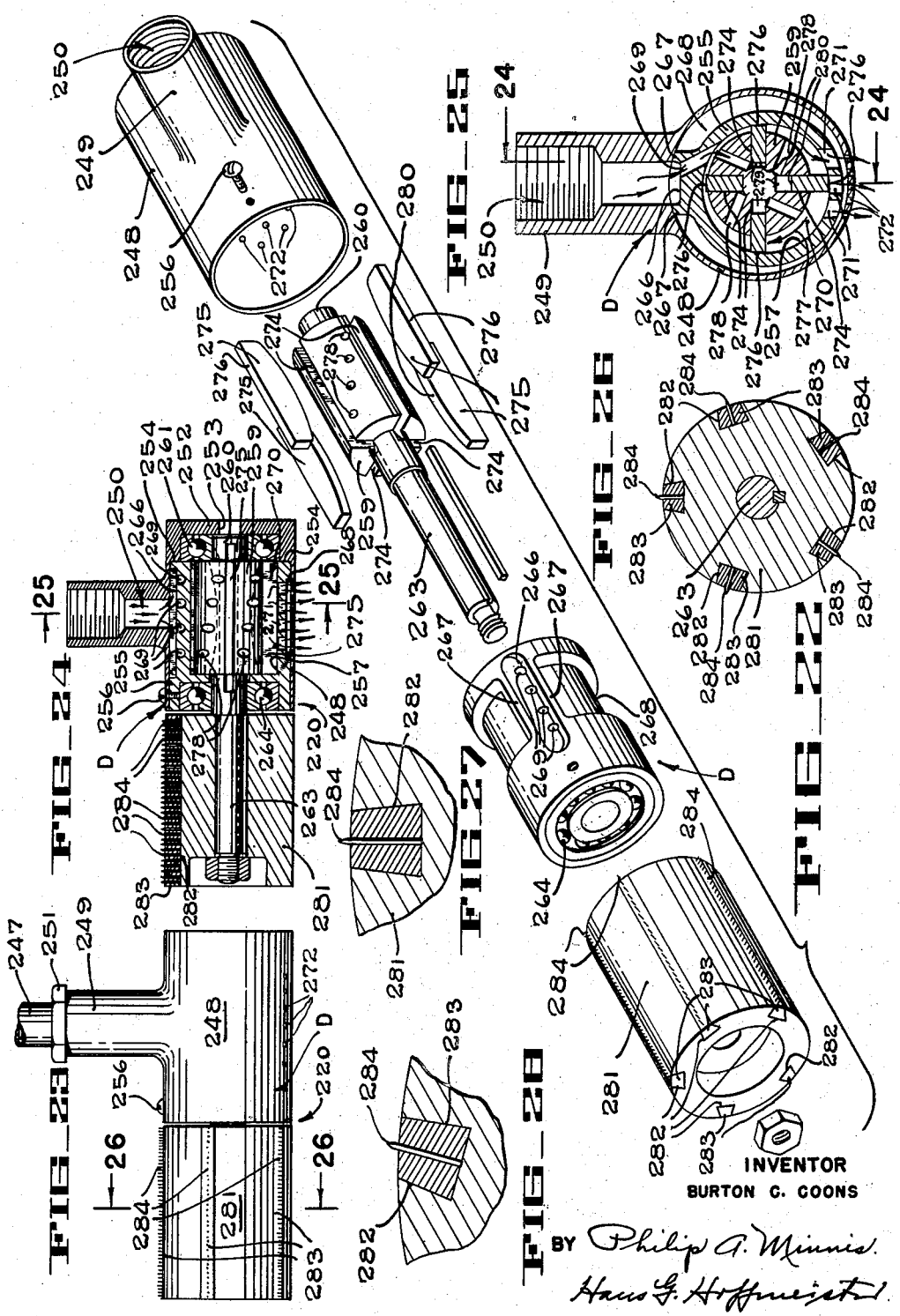

Aug. 25, 1953          B. C. COONS          2,649,878
TOMATO PARING AND CORING MACHINE
Filed Oct. 29, 1947                    14 Sheets-Sheet 11
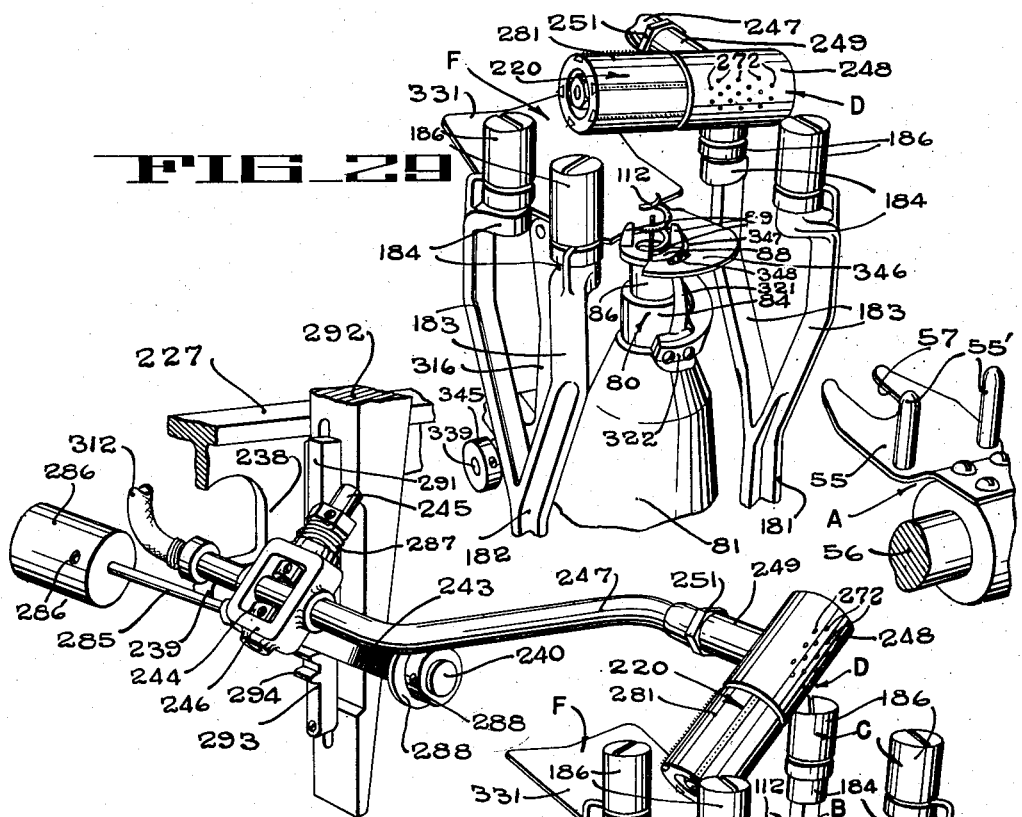
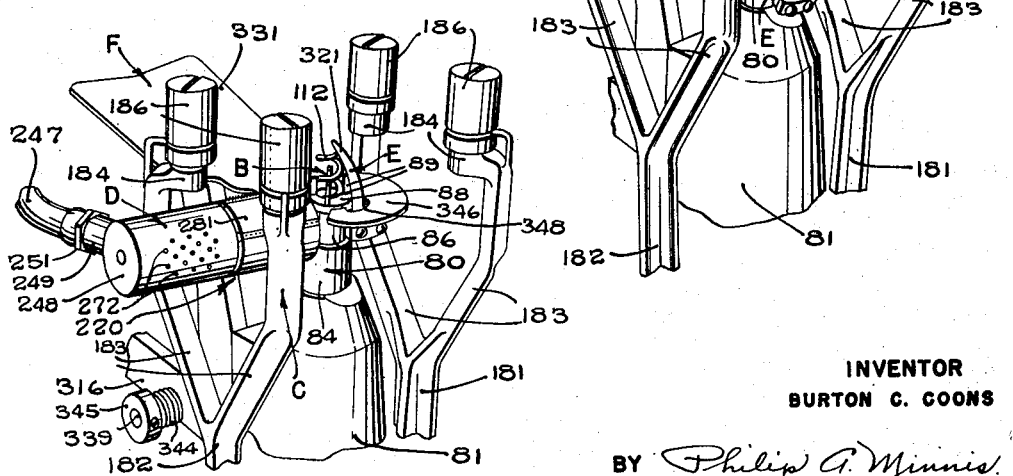
INVENTOR
BURTON C. COONS
ATTORNEYS Aug. 25, 1953          B. C. COONS                    2,649,878
                TOMATO PARING AND CORING MACHINE
Filed Oct. 29, 1947                              14 Sheets-Sheet 12
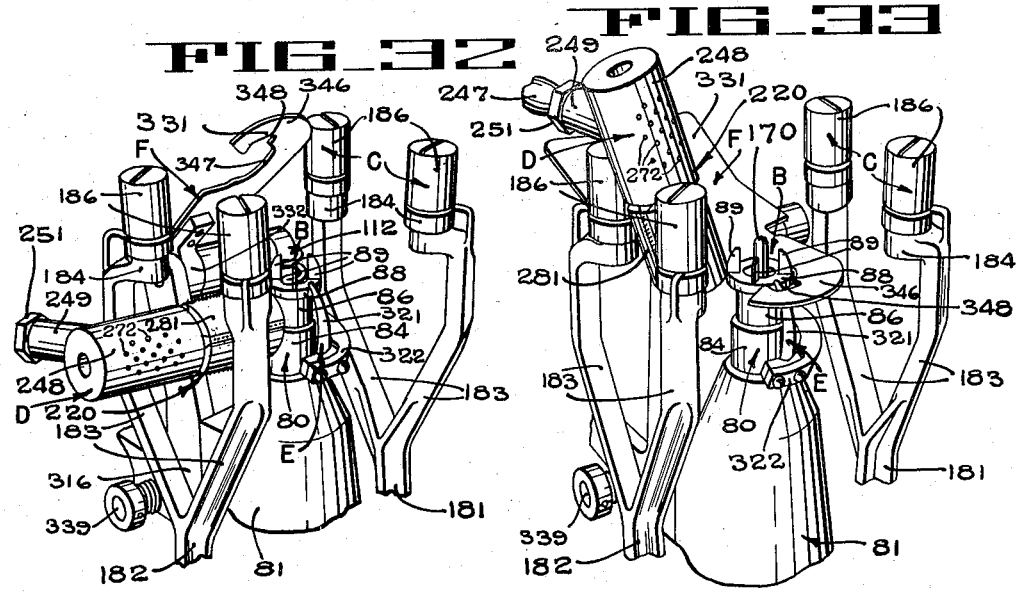
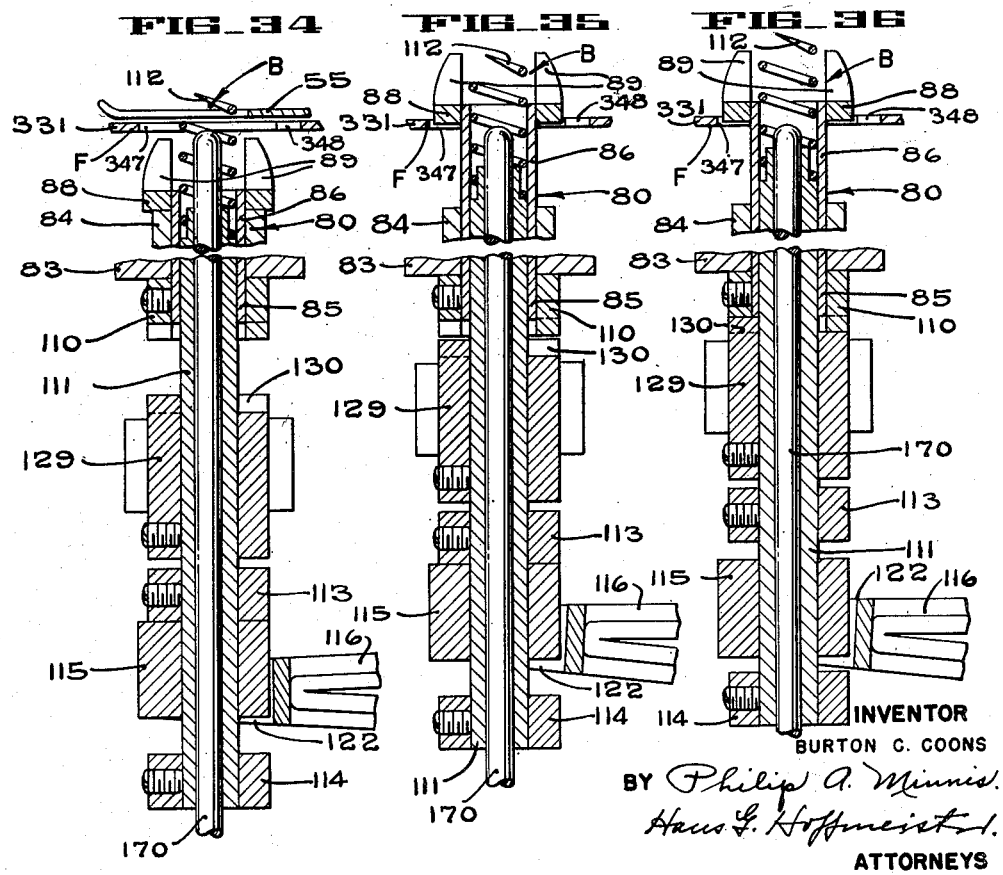
INVENTOR
BURTON C. COONS
BY Philip A. Minnis
   Hans G. Hoffmeister
ATTORNEYS

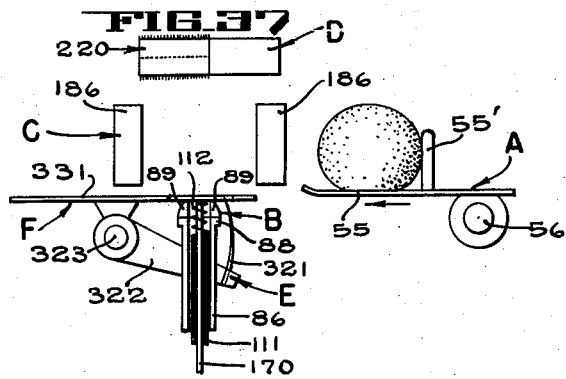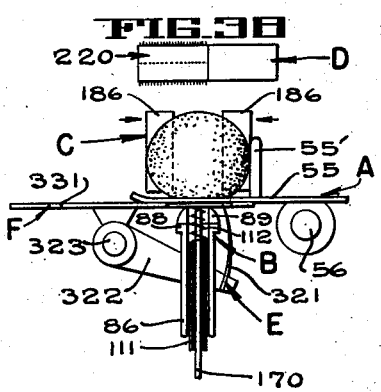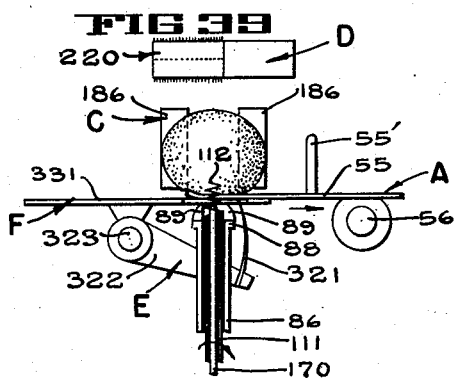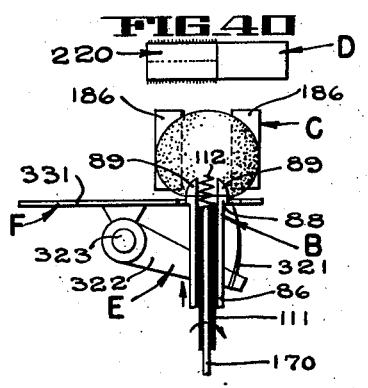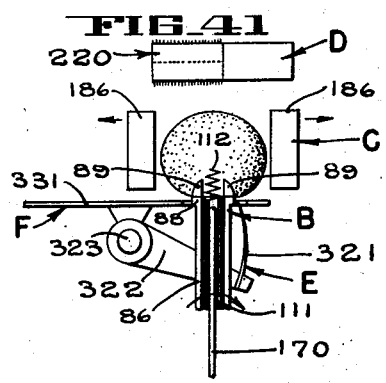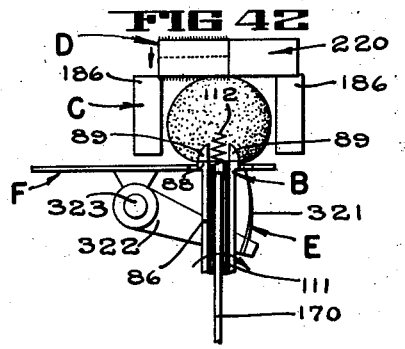

Aug. 25, 1953   B. C. COONS   2,649,878
TOMATO PARING AND CORING MACHINE
Filed Oct. 29, 1947   14 Sheets-Sheet 14
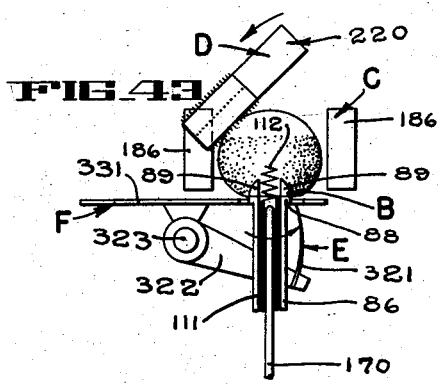
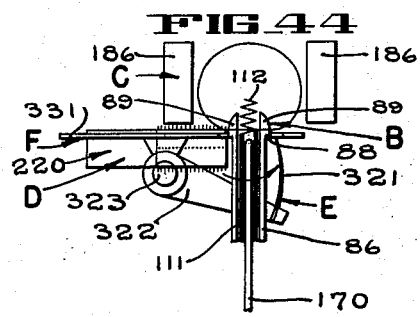
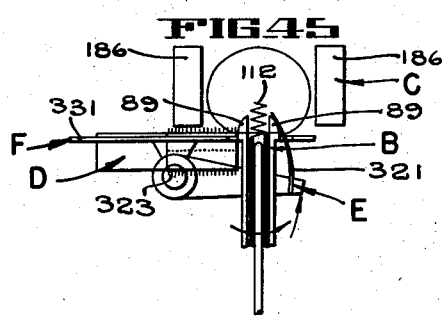
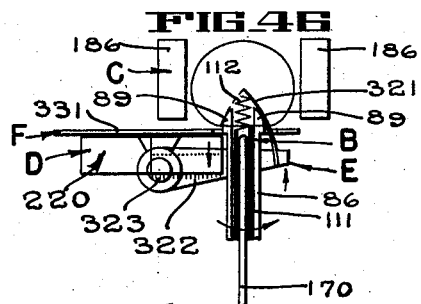
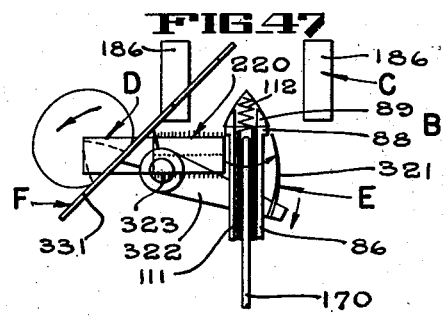
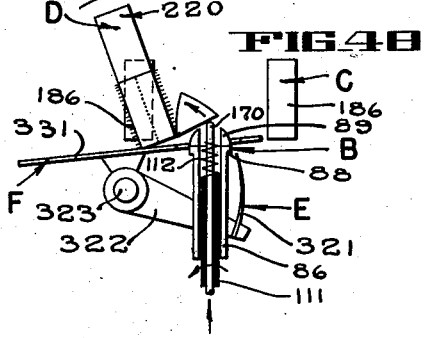
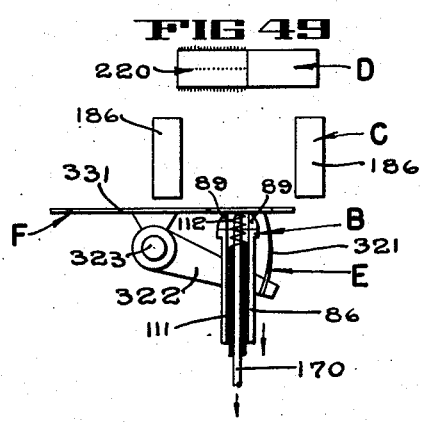
INVENTOR
BURTON C. COONS
BY *Hans G. Hoffmeister.*
ATTORNEY Patented Aug. 25, 1953

2,649,878

UNITED STATES PATENT OFFICE 2,649,878

TOMATO PARING AND CORING MACHINE

Burton C. Coons, San Jose, Calif., assignor to Food Machinery and Chemical Corporation, a corporation of Delaware Application October 29, 1947, Serial No. 782,784

12 Claims. (Cl. 146—38)

The present invention relates to a machine for preparing tomatoes or the like for canning or other processing.

One object of the invention is to provide an improved machine for peeling and coring tomatoes or similar fruit in a speedy and efficient manner.

Another object is to provide a tomato peeling and coring machine which will efficiently handle the fruit irrespective of variations in the size and shape thereof.

Another object is to provide a machine for peeling and coring comparatively tender tomatoes without damaging the fruit.

Another object is to provide an automatically operated machine for transferring fruit from a receiving station to a peeling and coring station, centering the fruit relative to said peeling and coring station, holding the fruit incident to a peeling and coring operation and for subsequently discharging the fruit in a gentle manner.

Another object is to provide an improved apparatus for feeding fruit to and centering the fruit relative to a fruit holder.

Another object is to provide a novel fruit holding spindle with apparatus adapted to be initially introduced into the fruit and to subsequently utilize the fruit to effect operation of a clutch for turning the spindle and fruit.

Another object is to provide apparatus for gently abrading the surface of the fruit to completely remove the skin layer therefrom.

Another object is to provide apparatus for progressively advancing a high speed abrading tool circumferentially along one side of a whole fruit while rotating the latter to subject the entire periphery of the fruit to the action of the abrading tool.

Another object is to provide apparatus associated with a tool for impaling the core portion of a fruit to rotate the same and to cut the core from the fruit to thereby release the fruit for discharge from the impaling tool.

Other objects and advantages of the present invention will become apparent in the following description and drawings in which:

Fig. 1 is a front elevation of a tomato preparation machine constructed in accordance with the present invention.

Fig. 2 is a side elevation of the machine, looking in the direction of line 2—2 of Fig. 1.

Fig. 3 is a rear elevation of the machine, certain parts being omitted for purposes of clarity.

Fig. 5 is an enlarged plan view of a portion of the machine taken along line 5—5 of Fig. 2.

Fig. 6 is an enlarged view of a portion of the structure shown in Fig. 5, certain parts being broken away, the peeler head being removed, and other parts being shown in different positions than they appear in Fig. 5.

Fig. 7 is a vertical section taken along line 7—7 of either Fig. 1 or Fig. 6, parts being broken away and other parts being shown in elevation.

Fig. 8 is a vertical section taken along line 8—8 of Fig. 6.

Fig. 9 is a detail elevation, partly in section, of the cam for operating the coring mechanism taken along line 9—9 in Fig. 6.

Fig. 10 is a plan view of the structure shown in Fig. 9.

Fig. 11 is a horizontal section taken along line 11—11 of Fig. 8, certain parts being broken away and other parts being omitted.

Fig. 12 is a side elevation, partly in section, of the structure shown in Fig. 11.

Fig. 13 is an enlarged perspective view of a portion of the mechanism for raising and lowering the fruit holding screw.

Fig. 14 is an enlarged view, partly in section, of a portion of the driving mechanism taken along line 14—14 of Fig. 4.

Fig. 15 is a vertical section taken along line 15—15 of Fig. 14.

Fig. 16 is an elevational view taken along line 16—16 in Fig. 4, showing the cam and associated parts for operating the feed mechanism.

Fig. 17 is an elevational view taken along line 17—17 in Fig. 4, showing the cam for operating the fruit holding screw.

Fig. 18 is an elevated view taken along line 18—18 in Fig. 4 showing the cam for lowering and raising the peeling mechanism.

Fig. 19 is an enlarged plan of a portion of Fig. 4 illustrating the cam and mechanism for operating the fruit centering jaws.

Fig. 20 is an elevational view taken along line 20—20 in Fig. 4 showing the cam for operating the core knock-out mechanism.

Fig. 21 is an elevational view taken along line 21—21 in Fig. 3 showing the cam for operating certain mechanism associated with the fruit holding screw.

Fig. 22 is an exploded perspective view of the peeler head.

Fig. 23 is a plan view of the peeler head assembled.

Fig. 24 is a longitudinal sectional view of the peeler head taken along line 24—24 in Fig. 25.

Fig. 25 is a transverse section taken along the line 25—25 of Fig. 24.

Fig. 26 is a transverse section taken along the line 26—26 of Fig. 23.

Fig. 27 is an enlarged section of a portion of the structure shown in Fig. 26, illustrating the skin-removing portion of the peeler head.

Fig. 28 is a view of a modification of the skin removing portion of the peeler head shown in Fig. 27.

Figure 4:
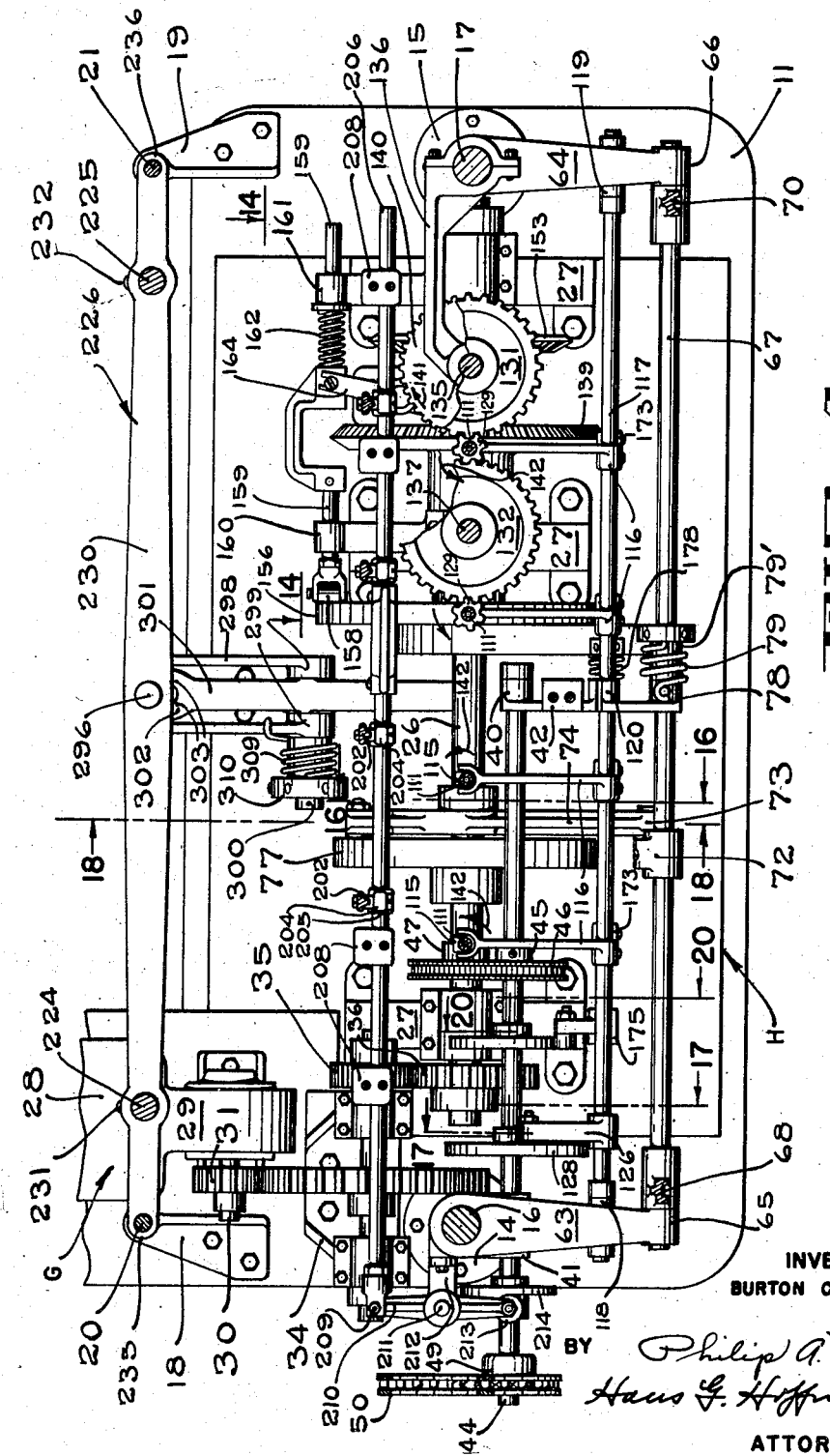
Fig. 4 is a horizontal section taken substantially along line 4—4 of Fig. 1, certain parts being removed and others broken away for purposes of clarity.

Figs. 29, 30, 31, 32, and 33 are enlarged perspective detail views of a portion of the operative parts of the tomato preparation machine in different positions during one cycle of operation thereof.

Figs. 34, 35, and 36 are enlarged vertical sectional views of a portion of one of the fruit supporting spindles illustrating different positions of the fruit holding screw and its associated mechanism.

Figures 37 to 49 illustrate diagrammatically the successive operational positions of the various implements comprised in each unit of the machine of the invention, relative to a tomato processed therein.

In general, the tomato preparation machine of the present invention (Figs. 1, 2, 3, and 7) comprises a feed mechanism A, a fruit holder B, a centering mechanism C, a peeling device D, a coring tool E, a discharge mechanism F, and a drive mechanism G. During the operation of the machine, each tomato deposited stem end down on the feed mechanism A is transferred thereby to the fruit holder B where it is properly positioned by the centering mechanism C with its stem end in alignment with the fruit holder for reception of an impaling means embodied in the same. The tomato is then rotated by the fruit holder while the peeling device D progresses over the periphery of the fruit to remove the skin therefrom after which the coring tool E enters the rotating fruit severing the core thereform to thereby release the cored fruit for removal from the impaling means of the fruit holder by the discharge mechanism F.

Referring now more specifically to the drawings, particularly Figs. 1, 2, and 3 thereof, it will be noted that the machine comprises a frame H including a rectangular base 11, which may, if desired, be supported a suitable distance above the floor by legs 12 provided at the corners of the base. Arranged adjacent each end of the base are brackets 14, 15, which are suitably secured to the base. A standard 16 projects upwardly from the bracket 14, and a similar standard 17 projects upwardly from the bracket 15. Fixed to the rear portion of the base 11 (Fig. 4) are brackets 18 and 19, from which upright standards 20 and 21 project. The upper portions of the standards 16 and 20 (Figs. 1 and 2) are connected by a cross bar 22 and a similar cross bar 23 (Figs. 1 and 7) connects the upper portions of the standards 17 and 21. Supported by the standards 16 and 17 disposed a suitable distance above the base 11 (Figs. 1, 2, and 3), is a rectangular table 24 adapted to support various mechanisms referred to hereinafter. Extending lengthwise of the machine and having its ends fixed to the cross bars 22, 23, is a tie rod 25, the purpose of which will be later described.

The drive mechanism G (Figs. 1 to 4) comprises a main shaft 26 which is journalled in suitable bearings of journal brackets 27 mounted in spaced relation on the base 11. Also mounted on the base is an electric motor 28 having a gear head 29 from which a shaft 30 extends which carries a pinion 31 (Figs. 2 and 4). The pinion 31 meshes with a gear 32 on a countershaft 33 (Fig. 4), journalled in suitable bearings in journal brackets 34 mounted on the base 11. The shaft 33 has a pinion 35 rigidly mounted thereon, said pinion being in meshing relationship with a gear 36 fixed to the main shaft 26. In this way, the main shaft 26 is driven through suitable reduction gearing by the electric motor 28. Shaft 26 serves, generally, with other means associated therewith, to impart movement to and and to control the movement of certain parts of the machine, as will be hereinafter more fully described.

Rotatably mounted in bearings 40 and 41 (Figs. 1 to 4) of brackets 42 and 63, respectively, which are secured to the frame is a shaft 44 which carries a sprocket wheel 45 (Fig. 4) which is driven by an endless chain 46 trained around the same and a sprocket wheel 47 on the main drive shaft 26. The shaft 44 extends outwardly a suitable distance beyond an end of the machine (Fig. 1) and has fixed thereto a sprocket wheel 49 (Figs. 1 and 2) which is connected by an endless chain 50 with a sprocket wheel 51 fixed to one end of a coring cam shaft 52. The shaft 52 is rotatably mounted in a bearing of bracket 53 (Figs. 1, 2, and 3) fixed to standard 16. The construction and arrangement of the drive mechanism is such that when the main drive shaft 26 is operated by the electric motor 28, shafts 44 and 52 will also be operated by the driving connections above described.

In the present machine (Figs. 1 to 4) several units designated I, II, III, and IV, each consisting of the mechanisms A, B, C, D, E, and F hereinbefore mentioned, have been illustrated it being understood, however, that any number of such units may be employed as desired for the purpose of peeling and coring a greater or lesser quantity of fruit per cycle of operation. Since these units are identical in construction, only one of them will be described in detail, like reference numerals being applied to like parts in each unit.

Feed mechanism

The feed mechanism A, by which tomatoes are delivered to the fruit holders B, is best shown in Figs. 1, 2, 5, 6, and 7. Each feed mechanism comprises a plate 55 (Figs. 5 and 6) having one end portion fixedly mounted on a rod 56 to project laterally therefrom in a substantially horizontal position. The end portion of the plate 55 outermost with respect to the rod 56, has an elongated notch 57 formed therein lengthwise of the plate for clearing the tomato impaling means of the fruit holder when the plate is positioned thereover during operation of the machine, see Fig. 6. The plate 55 is provided with a pair of upright pegs 55′ and is shaped to provide a support for a tomato placed thereon, either by an attendant or automatically, with the stem end of the tomato resting upon the plate.

The rod 56 is disposed lengthwise of the machine in a substantially horizontal position, and at each end, the rod is connected by a coupling 58 to a rod 59 (Figs. 1, 2 and 5) slidably mounted in spaced bearings 60, 61 of a bracket 62. One of the brackets 62 is fixedly mounted on the standard 16 and the other bracket is fixedly mounted on the standard 17. The bearings 60, 61 of each bracket 62 are arranged to slidably support the rods 59 in a substantially horizontal plane and at right angles to the rod 56 so that the rod 56 with the several tomato supporting plates 55 may be moved inwardly and outwardly with respect to the fruit holders B in a substantially horizontal plane by the actuating mechanism now to be described.

As shown in Figs. 2 and 4, a bracket 63 is secured to the standard 16 and a bracket 64 secured to the standard 17, each bracket being provided with a bearing 65 or 66, respectively, for rotatably supporting a rockshaft 67 which extends substantially the entire length of the machine. Fixed to the end portion of the rockshaft 67 adjacent bracket 63 and projecting upwardly therefrom, is an arm 68 (Fig. 2) having its upper extremity formed with an elongated eye 69 through which the rod 56 passes. A similar arm 70 (Fig. 8) having an elongated eye 71 to receive the rod 56, is fixed to the end portion of shaft 67 adjacent bracket 64.

Rigidly mounted on the rockshaft 67 and depending therefrom is an arm 72 (Figs. 2 and 16). Pivotally connected at 73 to the lower end of the arm 72 is the outer end of a link 74 which is slotted at 75 to receive the shaft 26. The inner end of link 74 has a follower roller 76 engaged with the track of a cam 77 on shaft 26. The cam 77 operates, as described later, in timed relation to other operating parts, to effect periodic reciprocations of the feed mechanisms A to deliver tomatoes to the respective fruit holders B, a dwell being provided when the parts are in the position shown in Fig. 5.

The rockshaft 67 is supported intermediate the bearings 65 and 66 by a bearing 78 formed on the bracket 42, hereinbefore referred to, and a spring 79 (Figs. 1 and 4) is coiled around a collar 79' fixed to the rockshaft 67 adjacent the bearing 78. The spring 79 is so mounted on the rockshaft 67 that, during movement of the feed plates 55 from the position shown in Fig. 6 to the position thereof shown in Fig. 5, said spring will be put under tension to maintain the tomato feeding mechanism under sufficient tension to quickly project the tomato supporting plates 55 thereof from the loading position shown in Fig. 5 to the position shown in Fig. 6. Another purpose of the spring 79 is to prevent any lag in the operation of the feeder actuating mechanism so that the latter is always in proper timed relation with the other mechanisms of the machine.

Fruit holders

Each fruit holder B (Figs. 7 and 8) comprises a spindle 80 arranged in a hollow conical pedestal 81 having a flanged base secured by bolts 82 to the table 24 (Fig. 7). Mounted in the base portion of the pedestal 81 (Fig. 8) and extending downwardly through an opening in the table 24, is a bushing 83. Another bushing 84 is mounted in the upper portion of the pedestal in vertical alignment with the bushing 83. The bushings 83 and 84 provide means for guiding a rotatable tomato carrier, i. e., the spindle 80, comprising a lower tubular section 85 which is mounted in the bushing 83 and an upper tubular section 86 which is mounted in the bushing 84. As will be hereinafter more fully described, both tubes 85 and 86 are adapted to be rotated periodically during the operation of the apparatus and in addition to being rotated, the upper tube 86 is adapted to be moved rectilinearly within the pedestal 81 with respect to the lower tube 85.

It will be noted that when the plate 55 of the feed mechanism is disposed over the spindle 80, as shown in Fig. 8, the upper end of the lower tube 85 is spaced a slight distance below the lower end of the upper tube 86. Suitable means hereinafter to be described are provided for interconnecting the two tubes 85 and 86 to provide a driving connection therebetween.

Mounted on the intermediate portion of the lower tube 85 and resting on the upper surface of the bushing 83 is a collar 87 by which said tube is supported in the pedestal 81 so that the lower end of the tube 85 extends downwardly a suitable distance below the lower end of the bushing 83.

The upper tube 86 extends a suitable distance above the top of the bushing 84 and is provided with an outwardly extending annular flange 88 which overlies the top of the bushing 84. The flange 88 limits downward movement of the tube 86 in the pedestal when said flange engages the top of the bushing 84 as shown in Fig. 8. Projecting upwardly from the flange 88 are a plurality of radially disposed tomato impaling fins 89 upon which each tomato delivered to the spindle is adapted to be impaled. The fins 89 are equally spaced on the flange 88 in annular arrangement around the central opening of the tube 86 (Figs. 8 and 10).

A collar 91 (Fig. 8) mounted on the upper portion of the lower tube 85, is held in position thereon by means of a plurality of screws 92 which extend outwardly a suitable distance from the exterior of the collar. The collar projects upwardly above the top of the tube 85 and telescopically receives the lower portion of the upper tube 86.

Fixed on the upper tube 86 at a point directly above the upper portion of collar 91 is another collar having a sleeve 93 which extends downwardly over the collar 91 (Figs 8 and 11). Elongated slots 94 (Fig. 8) are formed vertically in the sleeve 93, there being a slot for each screw 92. The construction is such that a slidable driving connection is provided between the tubes 85 and 86 by which rectilinear movement of the tube 86 with respect to the tube 85 is permitted while, at the same time, the engagement of the screws 92 with the side edges of the slots 94 effects rotation of tube 86 by tube 85, when the latter is rotated in the manner to be hereinafter described, irrespective of the relative vertical position of the upper tube 86 with respect to the lower tube 85.

For moving the upper tube 86 rectilinearly with respect to the lower tube 85, a lifter lever 95 (Fig. 8) is provided. One end of the lever 95 is fixed to a rockshaft 96 (Figs. 3, 8, and 21) journalled in bearings of brackets 97 fixed to the table 24 (Figs. 3 and 8). The other end of lever 95 is forked, as indicated at 98, Figs. 8, 11, and 12, so as to straddle the sleeve 93. Each arm of the forked portion or yoke 98 of lever 95, carries a stud 99 which extends into an annular groove or slot 100 (Fig. 11) formed on the lower portion of the sleeve 93. The studs 99 are diametrically disposed so that when the lever 95 is actuated the walls of the slot 100 will be engaged by the studs at opposite points and thereby impart movement to the upper tube 86 corresponding to the movement of the lever 95.

Fixed on the rockshaft 96 (Figs. 3 and 21) is one end of an arm 101 which extends from said shaft at an angle with respect to the angular disposition of the several lifter levers 95. Pivotally connected at 102 to the outer end of the arm 101 is the lower end of a link 103 provided with a slotted portion 104 engaging over the coring cam shaft 52 of the drive mechanism. The upper end of link 103 has a follower roller 105 engaged with the track of a cam 106 on cam shaft 52. During a cycle of operation of the machine, cam 106 is adapted to make one revolution, and as shown in Fig. 21, the track of cam 106 is formed with a section 107 which, when the roller 105 is engaged therewith, causes the link 103 to operate the arm 101 to rock the shaft 96. When the shaft 96 is rocked in the manner just stated, the lifter lever 95 and the tube 86 are lowered to the position shown in Figs. 8 and 34. The construction of the track of cam 106 is such that the tube 86 is maintained in an upwardly extended or lifted position with respect to the tube 85 during most of the cycle of operation of the machine (Figs. 29 to 33 and 35, 36). However, when a tomato is being delivered to and positioned on the fruit holder above the spindle 80, the tube 86 is retracted or lowered, as shown best in Figs. 8 and 34. The engagement of the follower roller 105 with the track of cam 106 is facilitated by a hood 108 on the cam having a contour substantially corresponding to the contour of the portion of the cam track indicated at 107 in Fig. 21.

The collar 87, as hereinbefore stated, holds the tube 85 in a fixed vertical relation with respect to the bearing 83 within which it rotates (Figs. 7, 8 and 34 to 36). Mounted on the lower end of the tube 85 is a toothed clutch collar 110 for holding the tube 85 against elevation for reasons which will hereinafter become apparent.

Slidably mounted within the aligned tubes 85 and 86 (Fig. 8) is a screw shaft 111 having a length greater than the combined length of the tubes 85 and 86. Fixed to the reduced upper end of the screw shaft 111 is an impaling screw 112 in the form of a single spiral tine. The upper extremity of the tine is preferably pointed so that it will readily pierce a tomato. The diameter of the screw is substantially the same from end to end and less than the diameter of the interior of the tube 86 so that the screw is freely movable within tube 86. The construction is such that the screw shaft 111 functions as a shaft for the screw 112, the screw being adapted to cooperate with the fins 89 of the tube 86 to retain a tomato on the spindle during the peeling and coring operations.

The screw shaft 111 extends downwardly through the tubes 85 and 86 and terminates a suitable distance below the lower end of the tube 85 (Figs. 8, 34, 35, and 36). Mounted on the lower portion of the screw shaft 111 is a pair of collars 113 and 114 which are spaced apart vertically to receive between them a block 115 within which the screw shaft 111 is rotatably received, as shown in Figs. 8, 13, and 34 to 36. For moving the screw shaft 111 rectilinearly within the guide provided by tubes 85 and 86, a lever 116 is provided. One end of the lever 116 is fixed to a rockshaft 117, rotatably mounted in bearings 118, 119 of brackets 63, 64, respectively. The shaft 117 is also supported intermediate its ends by a bearing 120 in the bracket 42 hereinbefore mentioned (see Figs. 4 and 8). The other end of lever 116 is forked, as indicated at 122 (Fig. 13), so as to straddle the block 115. The arms of the forked portion 122 of lever 116 are formed with slots 123 in which are disposed diametrically arranged studs 124 which project outwardly from the block 115 to provide a sliding pivotal connection between the block 115 and the lever 116 associated with each spindle 80. The collars 113 and 114 are so spaced that the block 115 has a limited amount of movement rectilinearly on the screw shaft 111 between the collars 113 and 114.

As shown in Figs. 4 and 17, fixedly secured to the rockshaft 117 is one end of an arm 126. The other end of arm 126 has a follower roller 127 engaged with the track of a cam 128 on the shaft 44 hereinbefore explained in connection with the drive mechanism. During a cycle of operation of the machine, cam 128 is adapted to make one revolution in which the shaft 117 is rocked to impart an upward and a downward movement to the several screw actuating levers 116 so that the tomato engaging tines or screws 112 are moved upwardly from the position shown in Figs. 8 and 34, are maintained elevated (Fig. 35) for a predetermined period of the cycle of operation of the machine, and are then lowered. Certain other characteristics of the raising and lowering movements imparted to the screw shafts 111 will be hereinafter described in connection with the explanation of the complete cycle of operation of the machine.

Above the collar 113 (Figs. 8, 34, 35, and 36) the screw shaft 111 has a gear clutch element 129 fixed thereto. The gear clutch element 129 has clutch teeth 130 on its upper portion arranged to engage the teeth of the clutch collar 110 on the lower end of the tube 85 when the screw shaft 111 is lifted by advancement of the screw 112 into the fruit in a manner as will hereinafter be described.

In the machine illustrated, disposed beneath the table 24 and adjacent the vertical center lines of each of the four pedestals 81 of the units designated I, II, III, and IV in Figs. 1 and 3, are similarly formed gears 131, 132, 133, and 134. Gear 131 is keyed to a vertically disposed drive shaft 135 (Fig. 14) rotatably mounted in the bearings of a bracket 136 supported from the standard 17, also shown in Figs. 3 and 4. The teeth of gear 131 are in meshing relationship at all times with the gear teeth of the gear clutch element 129 of the screw shaft 111 in the spindle of pedestal of unit I. The teeth of gear 132 are in meshing relationship at all times with the teeth of the gear clutch elements 129 of the screw shafts 111 in the spindles of pedestals of the units I and II (Fig. 4). Likewise, the teeth of gear 133 are in meshing relationship at all times with the teeth of the gear clutch elements 129 of the screw shafts 111 in the spindles of pedestals of the units II and III, and the teeth of gear 134 are in meshing relationship at all times with the teeth of the gear clutch elements 129 of the screw shafts 111 in the spindles of pedestals of the units III and IV. Each gear 132, 133, and 134 is mounted on a separate vertically disposed stud or axle 137 for free rotation. Gear 131 (Fig. 4) is driven from the main drive shaft 26 through gearing including bevel gears 139 and 140 arranged to rotate vertical shaft 135 in the direction of the arrow 141 (Fig. 4) so that all screw shafts 111 will rotate in the direction of the arrows 142 (Fig. 4) through the intermeshing relationship of the several gears in the manner above described.

During a portion of each cycle of operation of the machine it is necessary to reverse the direction of rotation of the screw shaft 111 for the purpose of unscrewing the tine 112 from the core of the tomato at the completion of the coring operation. Consequently, means have been provided for periodically reversing the direction of rotation of the drive shaft 135.

Referring now to Figs. 4, 14, and 15, wherein is shown the reversing mechanism of the present invention, it will be noted that bevel gear 139 has its hub fixedly connected to a bushing 144, by a set screw 145, or any other suitable means. One end face of bushing 144 is formed with clutch teeth 146, adapted to mesh with the teeth 147 on an end face of a clutch sleeve 148 slidably mounted on the main drive shaft 26 and keyed thereto, as indicated at 149 (Fig. 15) for rotation at all times therewith. The other end face of clutch sleeve 148 is formed with teeth 150 arranged to engage the teeth 151 on an end face of a bushing 152 mounted on the main drive shaft 26 in a manner similar to the manner in which bushing 144 is mounted on said shaft. A bevel gear 153 has its hub mounted on the bushing 152 and fixedly connected thereto by a set screw 154, or other suitable fastening means. The teeth of bevel gear 153 are in meshing relationship with the teeth of a bevel gear 155 fixedly secured to the lower end of the drive shaft 135.

Fixed to the main drive shaft 26 (Figs. 14 and 15) is a gear shifting cam 156, having a cam track 157 engaged by the follower roller 158 of a gear shifting rod 159 slidably mounted in bearings 160, 161 formed on two of the brackets 27 hereinbefore referred to (Figs. 4 and 15). The roller 158 is maintained in engagement with the cam track 157 by a coil spring 162 coiled around the rod 159 and bearing at one end against a shoulder 163 formed on said rod, and bearing at the other end against an end face of the bearing of bracket 161. A pair of swingable gear shifting levers 164, pivotally mounted at 165 on a bracket 166 secured to the base 11, have their forked ends pivotally connected to the rod 159, as indicated at 167, and their other ends provided with a roller 168 disposed in a sheave 168a secured to a clutch sleeve structure 148.

Normally, the cam 156 maintains the parts in the position in which the teeth 147 of the clutch sleeve 148 are engaged with the teeth 146 so that bevel gear 139 is connected to the shaft 26 and gears 131, 132, 133, and 134 are thereby rotated in the direction of the arrow 141 (Fig. 4) in the manner heretofore described. Each of the screw shafts 111 is, in this manner, simultaneously rotated in the direction of the arrow 142 (Fig. 4). When the clutch member 148 connects bevel gear 139 with shaft 26, bevel gear 153 is an idler gear, and vice versa when the clutch member 148 is shifted by cam 156 from the position shown in Fig. 15, to the left, bevel gear 139 becomes an idler gear and bevel gear 153 is the driving gear, with the result that gears 131, 132, 133, and 134 are rotated in the reverse direction to the direction of the arrow 141, Fig 14. When the clutch member 148 is shifted from one position to the other position, above described, there is a dwell of the gears 131, 132, 133, and 134 and also of the screw shafts 111, and, as will be hereinafter brought out, this dwell occurs in timed relation with the removal of the core of the tomato at the completion of the coring operation.

As shown in Figs. 8, 34, 35, and 36, slidably mounted within the tubular screw shaft 111 is a core knock out rod 170 which extends upwardly in the shaft and terminates within the screw 112. Mounted on the lower end portion of the rod 170 is a block 171 (Fig. 8) having a pair of diametrically disposed studs 172 which are engaged by the outer forked end of a core knock out lever 173. The other end of lever 173 is fixed to a rockshaft 174 rotatably mounted in bearings of the brackets 63, 64, heretofore described (Fig. 2). Fixed to the rockshaft 174 (Figs. 1 and 20) is one end of an arm 175. The other end of arm 175 has a follower roller 176 engaged with a cam 177 secured to shaft 44. A torsion spring 178 (Fig. 1) is coiled around a collar 179 fixed to rockshaft 174 adjacent the bracket 42, through which the rockshaft extends for urging the arm 175 in a direction to maintain the follower roller 176 in constant engagement with the cam 177. The torsion spring 178 also acts to maintain the core knock out lever 173 and rod 170 in their lowermost position (Fig. 8). During a cycle of operation of the machine, cam 177 is adapted to make one revolution in which a tooth 180 of the cam 177 momentarily actuates the arm 175 so that the shaft 174 is rocked to impart an upward movement to the several levers 173. In this manner the core knockout rods 170 are moved upwardly from the position shown in Fig. 8 to thereby knock the cores from the tops of the spindles. The upward movement imparted to each core knock-out rod 170 is subsequent to each peeling operation and is in timed relation with the delivery of a tomato to each spindle so that the fins 89 and screw 112 will be cleared of all refuse immediately before a tomato is delivered to the spindle. It will be understood that the tooth 180 of the cam 177 operates the lever 173 only momentarily so that the core knock-out rod 170 of each spindle is reciprocated in a quick upward and downward movement within the screw shaft 111.

*Centering mechanism*

The centering mechanism C for each spindle 80 comprises a pair of arms 181, 182 (Figs. 1, 6, 7, and 29 to 33) each of said arms having its upper portion forked to provide a pair of upstanding shanks 183. Each shank is formed with a laterally offset portion 184 (Figs. 7 and 29), from which projects an upwardly extending stem 185 on which is rotatably mounted a tomato engaging roller 186 in the manner shown in Fig. 7.

The arm 181 is disposed at one side of the pedestal 81 and the arm 182 is disposed at the opposite side of the same pedestal, as viewed from the front of the machine (Fig. 1), and the arrangement of the forked portions 183 and the rollers 186 is such that a roller of each arm is disposed a predetermined distance forwardly of a line extending lengthwise of the machine and passing through the vertical axes of the pedestals and the other roller of each arm is disposed a corresponding distance rearwardly of the same line (Fig. 8). Thus, the rollers 186 are, as shown in Figs. 5 and 6, located at each corner of an imaginary rectangle so as to engage the exterior surface of a tomato at widely spaced points and to center the tomato with respect to the vertical axis of the spindle 80 in the manner to be hereinafter described.

The arms 181, 182 (Figs. 5, 6, and 7) extend upwardly in a generally vertical direction from parallel bosses 187, 188, mounted on rockshafts 189, 190, respectively. The rockshaft 189 (Fig. 8) is rotatably mounted in bearings 191, 192, carried by brackets 193 and 194, respectively, and the rockshaft 190 (Fig. 6) is rotatably mounted in bearings 195, 196, also carried by said brackets.

The bracket 193 is in the form of an elongated casting that is mounted on the top of the table 24 substantially in parallel relationship with the front longitudinal edge thereof, and the bracket 194 is similar in construction and is, likewise, mounted on the top of the table 24 substantially in parallel relationship with the rear longitudinal edge thereof (see Figs. 2, 4, 6, 7, and 8).

The arms 181, 182 are adapted to be periodically oscillated by the rockshafts 189, 190 toward and away from each other. Short arms 197, 198 (Figs. 1 and 5), extending substantially horizontally toward each other from the bosses 187 and 188, respectively, are joined together end to end by a pin and slot connection indicated at 199, to couple the same in such a manner that when one rockshaft is rotated in one direction the other rockshaft will be simultaneously rotated in the opposite direction. A collar 200 is secured to the rockshaft 190 adjacent the bearing 196 and a torsion spring 201 surrounding the shaft 190 has one end secured to the collar 200 and its opposite end anchored to the bracket 194 for normally urging the arms 181, 182 toward each other to dispose the centering rollers in fruit centering position, as shown in Fig. 6.

Fixed to the rear end of each rockshaft 189 of the machine and depending therefrom is an arm 202 (Figs. 3, 7, and 8), having its lower extremity fitted with a stud 203 which is disposed within a loop 204 extending upwardly from a collar 205 mounted on a rod 206. The rod 206 is slidably mounted for reciprocation lengthwise of the machine in bearings 207 carried by a plurality of brackets 208 depending from the table 24 (Fig. 3).

As shown in Figs. 2, 3, 4, 5, and 19, one end of the rod 206 extends beyond the end of the table 24 and is pivotally connected by a pin 209 to one end of a lever 210 having a fulcrum provided by a stud 211 carried by a bracket 212 mounted on the standard 16. The other end of lever 210 is provided with a follower roller 213 which is maintained in engagement with the track of a cam 214 mounted on the shaft 44, by a spring 215 coiled around a collar 216 fixed on the stud 211 in the manner shown in Fig. 2.

The arms 181, 182 are urged away from each other, against the action of torsion spring 201, due to shifting of the loops 204 and rod 206 into the position shown in Figs. 3 and 4 under the influence of the spring 215 on the lever 210 so that the arms assume the position shown in Figs. 1 and 5, in which the pairs of centering rollers 186 of each arm are spaced apart a suitable distance to provide a wide gap between them through which a tomato can be delivered to the fruit holder B by feed mechanism A. As a tomato is positioned by the feed plate 55 on top of the pedestal 81, the roller 213 on lever 210 climbs the acclivity of the cam 214 whereby the arms 181, 182 are released for movement toward each other by their respective torsion springs 201 to thereby reduce the space between the pairs of rollers 186 for the purpose of centering the tomato with respect to the screw 112. Since the centering arms 181, 182 are spring actuated, it is apparent that their movement toward each other is limited by the tomato engaged by their respective rollers 186. Consequently, irrespective of the size of the tomatoes presented thereto, the four point engagement of each tomato results in a centering of the tomato relative to the vertical axis of the spindle 80. After the tomato has been centered and secured relative to the fruit holder B by the screw 112, the arms 181, 182 are returned to their spread apart position shown in Fig. 5 so that the exterior surface of the tomato is exposed for peeling.

Peeling device

Associated with each pedestal I, II, III, and IV (Figs. 1, 2, 5, 7, and 22 to 33, inclusive) is a peeling device D including a peeler head unit, generally indicated at 220, and means for operating the same. The peeler head unit 220 moves over the tomato in a generally downward direction as the tomato is rotated by the tube 86, and during this downward movement the peeler head is turned in such a manner as to follow the generally spherical contour of the tomato along one side thereof while the tomato is rotating with the spindle 80 so as to present the entire skin area of the tomato to the peeling device for removal of the skin thereby in a manner as will hereinafter become apparent.

As shown in Fig. 3, the tie-rod 25 has mounted thereon in suitably spaced apart relation a pair of bearing brackets 221 and 222, each of which are formed with vertical bores 223 (Fig. 5) for receiving the vertical rods 224 and 225 of a frame 226 of a peeling device actuating mechanism. The frame 226 (Figs. 1 and 3) also includes an upper horizontal bar 227 fixed to the rods 224 and 225 by set screws 228 and 229, respectively, and a lower horizontal bar 230 fixed to the rods 224 and 225 by set screws 231 and 232, respectively.

One end of the upper horizontal bar 227 (Fig. 3) extends beyond the rod 224 and has a bearing 233 formed at its extremity which is engaged with the fixed standard 20. The other end of the bar 227 extends beyond the rod 225 and its extremity is formed with a bearing 234 which is engaged with the fixed standard 21. In a similar manner the lower horizontal bar 230 has a bearing 235 formed on one end thereof for engagement with the standard 20, and a bearing 236 formed on the other end thereof for engagement with the standard 21. The construction is such that the frame 226 is movable as a unit rectilinearly on the standards 20, 21 with respect to the stationary frame structure of the machine.

Depending from the upper horizontal bar 227 are a plurality of arms 238, there being one such arm for each peeler head unit 220, as shown in Figs. 3 and 7. The lower end of each arm 238 is formed with a boss 239 in which one end portion of a shaft 240 is fixed. The shaft 240 of each arm extends forwardly from the frame 226 in the general direction of the respective pedestal 81. Mounted on the shaft 240 (Fig. 7) and free to rotate thereon, are spaced bearings 241 and 242 of a bracket 243. Intermediate its length the bracket 243 has an upstanding portion 244 to which is pivotally connected by a pin 245 a yoke 246 adapted to support the peeler head unit 220. The pin 245 is arranged at right angles to the longitudinal axis of the shaft 240 and with the freely rotatable bracket 243 provides a universal joint connection between the peeler head assembly and the frame 226.

Each peeler head unit 220 (Figs. 2, 5, 7, and 22 to 33) is secured to the outer end of a tubular arm 247 (Figs. 5 and 30) having its inner end portion mounted in the yoke 246. The part of the peeler head unit which is fixed to the outer end of the arm 247 (Figs. 22 to 25) comprises a hollow cylindrical casing 248 from which projects a laterally extending boss 249 having a bore 250 formed therein. A portion of the bore 250 is threaded to receive the threaded end of the arm 247, and the casing 248 is locked in position on said arm by means of a lock-nut 251 (Figs. 23 and 30) which is mounted on the arm and is adapted to be turned into tight engagement with the end face of the boss 249 after the parts of the head unit 220 within casing 248 have been assembled and attached to the arm 247 (Fig. 5). The construction is such that the conduit in the tubular arm 247 is in communication with the interior of the casing 248 (Fig. 24) through the bore 250.

The casing 248 has an outer end wall 252 (Fig. 24) preferably formed integrally therewith and having an opening 253 concentric with the longitudinal center line of the casing. Between the end wall 252 and the boss 249, the interior of the side wall of casing 248 is formed with a shoulder 254. A body 255 is retained in position within the casing by means of a set screw 256.

The body 255 is provided with a cylindrical bore 257 having its longitudinal axis disposed eccentric with respect to the longitudinal axis of the casing 248 (Fig. 25). Disposed within this eccentric cylindrical bore 257 (Figs. 22, 24, and 25) is a rotor 259. Projecting from one end of the rotor 259 is a stub shaft 260 which is journalled in a ball bearing 261 mounted within the space between the end wall 252 and shoulder 254. The bearing 261 may be lubricated when necessary by introducing lubricant through opening 253. Arranged in axial alignment with stub shaft 260 and extending from the opposite end of the rotor 259, is a shaft 263 which is rotatably supported by a ball bearing 264 mounted in the body 255 in the manner shown best in Fig. 24.

The exterior of the cylindrical body 255 (Fig. 22) is formed with a longitudinal recess 266 having suitable length and depth, and a width equal substantially to the diameter of the inner portion of the bore 250 (Fig. 25). At each side of the recess 266 the exterior of the body 255 is formed with longitudinally extending ribs 267 which separate the recess 266 from an annular recess 268 provided on the body 255.

When the body 255 is being assembled within the hollow casing 248, the ribs 267 are disposed at each side of the inner end of the bore 250 so that the recess 266 registers with said bore. The surface of the annular recess 268 is formed concentric with the eccentrically disposed bore 257 so that an unsymmetrical annular chamber is provided within the casing 248, said chamber having a greater depth adjacent the ribs 267 than at the point within the casing diametrically opposite the recess 266. A series of ports 269 formed in the wall of the body 255 connect the recess 266 with an unsymmetrical chamber 270 (Fig. 25) provided within the body 255 between the rotor 259 and the wall of the bore 257. Ports 271 connect chambers 268 and 270, and exhaust ports 272 are formed in the wall of the casing 248 so as to connect chamber 268 with atmosphere. Ports 269 constitute inlet ports, and ports 271, 272 constitute outlet ports.

Loosely mounted in a plurality of diametrically disposed slots 274 (Figs. 22, 24, and 25) formed in the rotor 259 and in parallel relationship with the longitudinal axis thereof, are vanes 275 having surfaces 276 in engagement with the inner surface of the cylindrical bore 257. Since the axis of rotation of the rotor 259 is offset with respect to the center of the cylindrical bore 257 (Fig. 25), fluid under pressure admitted into chamber 270 through the inlet ports 269 will act upon the vanes 275 to thereby rotate the rotor in the direction of the arrows 277 (Fig. 25). The body of the rotor 259 has a series of ports 278 formed therein. These ports are arranged in groups of four between each of the slots 274, the ports of each group being disposed at an angle inclined with respect to the longitudinal axis of the rotor, as shown in Figs. 22 and 24. The ports 278 provide means by which fluid under pressure in chamber 270 is admitted to the space 279 in the slots 274 underneath the interior edges 280 of the vanes 275 for the purpose of maintaining said vanes in contact with the surface of the bore 257.

Mounted on the shaft 263 for rotation therewith, is a roller 281 of special construction to provide a peeler. As shown in Figs. 22, 23, 24, and 26, the roller 281 comprises a cylindrical body formed lengthwise of its periphery with a suitable number of dove-tail mortises 282 which are arranged in parallel relationship with respect to the longitudinal axis of the roller. Tightly mounted in each mortise 282 is an elongated dove-tail block 283 in which are mounted in closely spaced arrangement and preferably in a straight line, needles 284 constituting the peeling points of the roller. The needles 284 are mounted in the blocks 283 so that their pointed ends project outwardly beyond the surface of the roller a distance corresponding substantially to the average thickness of the skin of a tomato. The manner in which the needles 284 are mounted in the blocks 283 and the manner in which the blocks are mounted in the mortises 282 is such that, as shown in Figs. 26 and 27, the peeling needles 284 are radially disposed on the roller.

However, in lieu of the radial arrangement of the needles 284 shown in Fig. 27, the mortises 282 may be so formed that when the blocks 283 are mounted therein, the needles 284 will be disposed at an angle directed towards the direction of rotation of the roller 281, as shown in Fig. 28.

The roller 281 is operated at high speed by the pneumatic engine provided by the rotor 259 and associated parts above described, so that the prickles provided by the needles 284 get into repeated touch with the skin of the tomato whereby the skin is perforated at countless points and pulled from the pulp of the tomato at the same time.

As shown in Figs. 2, 5 and 30, projecting rearwardly from the yoke 246, is a rod 285 on which is mounted a counterweight 286 adapted to neutralize the downward movement of the peeler head 220 about the fulcrum provided by the pin 245. The counterweight 286 is adapted to be secured to the rod 285 by a set screw 286' and is adjustable relative to the rod for attaining a substantial balance between the weight 286 and the arm 247 with head 220 attached. In this manner, the peeling unit D is constructed so that the counterweight 286 counterbalances the weight of the peeler head unit 220 relative to the pivot pin 245. However, the pivotal connection between the yoke 246 and the bracket 243 is provided with a torsion spring 287 coiled around an end portion of the pivot pin 245 (Fig. 6) and secured to a collar 287' fixed to the pin 245.

The torsion spring 287 effects the balanced peeling unit in such a manner that the roller 281 of the peeler head 220 is constantly urged toward the surface of a tomato irrespective of the position of the peeler head unit as it travels around the periphery of the tomato. The spring 287 thereby maintains the peeler head under proper pressure against the tomato to be peeled and excessive pressure of the peeler head against the tomato is therefore avoided. The spring 287 is set with sufficient tension to urge the peeler head against a tomato positioned on the spindle 80 so that the skin of the tomato is removed by the needles 284 of roller 281 from the entire surface of the tomato including indentations thereon exclusive of the stem recess, without damaging the meat of the tomato.

In this way, a wide variety of tomatoes ranging from relatively hard tomatoes to relatively soft tomatoes can be processed by the machine and the amount of pressure of the peeler head against a tomato can be controlled to such a degree, through the adjustment of spring 287 and counterweight 286, that imperfections and uneven places will be removed through the action of the peeler head roller 281.

In order to limit movement of the peeler head 220 toward the fruit holder when there is no tomato positioned on the spindle 80, a stop is provided by a cam 288 mounted on the shaft 240 and fixed thereto by a set screw 288'. The cam 288 has a peripheral cam surface which, when engaged by arm 247, imparts to the peeler head a movement simulating the travel of the peeler head over a relatively small tomato positioned on the spindle 80. In this way, the peeler head is kept away from the fins 89, the screw 112, and other parts at the upper portion of the spindle in the absence of a tomato thereon and also during return movement of the peeler head after the completion of each peeling and coring operation.

The cam 288 being secured to the shaft 240 in engagement with the bearing portion 241 of bracket 243 limits movement of the bracket 243 lengthwise of the shaft 240 in one direction (Fig. 7), and a collar 289 mounted on the shaft 240 and engaging the opposite end of the bearing portion 241 of the bracket prevents movement of the bracket 243 lengthwise of said shaft in the opposite direction.

The bearing 242 of bracket 243 (Fig. 7) is provided with a cam 290 which normally engages a surface 291 provided on a bracket 292 extending downwardly from the tie rod 25. One such bracket 292 is provided adjacent each peeling device of the machine and each bracket 292 is provided with a rack bar 293. Formed on each rack bar is a series of teeth 294 which are located a considerable distance below the shaft 240 when the peeler head unit is in normal uppermost position (Fig. 7). Disposed for rotative movement on the shaft 240 and secured to the end wall of cam 292 formed on the bearing 242 of bracket 243 is a pinion gear 295, the teeth of which are arranged to be brought into meshing relationship with the teeth of the rack bar 293 when the peeling unit is lowered, in a manner to be hereinafter set forth, to thereby rotate the peeling assembly for effecting movement of the roller 281 along the periphery of the tomato. When the peeling assembly is in raised position, as shown in Fig. 7, the cam 290 on the bracket 243 engages the aforementioned surface 291 on bracket 292 for maintaining the roller 281 of the peeler head 220 in a horizontal position above the spindle 80 (Fig. 29). The surface 291 terminates adjacent the first tooth 294 of the rack bar 293 so that as soon as the pinion 295 engages said tooth the bracket 243 is free to rotate for turning the peeling assembly about the shaft 240 as it is lowered.

The construction is such that the peeler head 220 is turned through an angle of approximately 180° when the pinion 295 travels over the rack bar 293, during downward movement of the peeling assembly, so that the peeler head 220 is turned through an arc from a substantially horizontal position above the spindle 80 (Fig. 29) to vertical position and finally to a substantially horizontal position laterally thereof as shown in Fig. 31 in which position the peeler head 220 is disposed in a plane below the top of the screw 112.

The lowering and raising of the peeler head units 220 so as to bring the gears 295 into meshing relationship with the teeth of their respective rack bars 293 is effected by lowering and raising the frame 226 as a unit by mechanism now to be described.

Fixed to the midpoint of the cross bar 230 (Figs. 1 and 3) of the peeler actuating frame 226 and depending therefrom, is a rod 296 having its lower portion slidably mounted in the bearing 297 of a bracket 298 mounted on the base 11 of the machine in the manner shown in Figs. 1, 3, and 18. The bracket 298 is also formed with upstanding spaced bearings 299 which support a pin 300 horizontally to provide a fulcrum for a lever 301 (Fig. 18) for actuating the frame 226. One end of the lever 301 is forked as at 302 (Fig. 18) and the arms 303 of the forked portion straddle a collar 304 secured to the rod 296. The arms 303 are formed with slots 305 in which are disposed diametrically arranged studs 306 which project outwardly from the collar 304 to provide a sliding pivotal connection between the collar and the lever 301. The other end of lever 301 has a follower roller 307 engaged with the track of a cam 308 on the main drive shaft 26. A torsion spring 309 (Figs. 1, 3, and 4) coiled around a collar 310 fixed to the pivot pin 300 is provided to place the lever 301 under tension so as to assist the cam 308 in returning the frame 226 to its uppermost position (Fig. 3) at the conclusion of each peeling and coring operation, for reasons to be explained later in connection with the description of the operation of the machine.

The tubular arm 247 of each peeling unit extends through the yoke 246 (Figs. 7 and 30) and its extremity has attached thereto an end of a hose 312 or other similar tubular flexible member. The other end of each hose 312 (Figs. 2 and 3) is connected to a manifold 313 mounted on the upper bar 227 of the peeler actuating frame 226. Air under pressure from a suitable source of supply (not shown) is constantly delivered to the manifold 313 through a pipe 314 connected thereto. In this way operating fluid continually conducted to each peeler head unit for operating each rotor 259 in the manner heretofore described.

*Coring and discharge units*

Each coring tool E and each discharge mechanism F is supported by a bracket 316 secured to the pedestal 81 by bolts 317 (Figs. 8, 9, and 10). Extending upwardly from the main body of each bracket 316 is a pair of spaced arms 318, and extending rearwardly from the lower portion of each bracket is a pair of spaced arms 319. The arms 319 are formed with bearings 320 (Figs. 9 and 10) which are suitably spaced for receiving the cam shaft 52. Thus, shaft 52 is supported at suitably spaced intervals by the bearing of bracket 53 and the bearings 320 of the brackets 316, as shown in Figs. 1, 3, and 5.

Each coring tool E (Figs. 8, 9, and 32) comprises a curved knife blade 321 mounted on the outer end of a knife blade holder 322. The other end of the knife blade holder 322 is fixed to a rockshaft 323 rotatably mounted in bearings 324 of bracket arms 318.

Fixed to the shaft 52 (Figs. 8, 9, and 10) at a suitable point adjacent each pedestal 81, is a coring cam 325 having a cam track engaged by a follower roller 326 on the lower extremity of a coring knife actuating lever 327 (Fig. 9). The upper end of lever 327 is fixed by a set screw 328 to rockshaft 323 (Fig. 10).

The construction is such that the holder 322 is swingable vertically upon actuation of the lever 327 by cam 325, whereby the coring knife blade 321 is moved upwardly from the position shown in Figs. 9 and 29 to the coring position shown in Fig. 31. It will be understood that the cam 325 makes one revolution during each cycle of operation of the machine and the contour of the cam track is such that at the completion of the peeling operation, follower roller 326 acts to swing lever 327 and thereby turn shaft 323 so that coring knife blade holder 322 is swung upwardly. The arrangement of the curved knife blade 321, the fins 89, and the tomato retaining screw 112 is such that, when the holder 322 is swung upwardly by its actuating mechanism, the knife blade 321 is projected into the stem end portion of the tomato impaled on top of the spindle and, since the tomato is rotating, the core will be cut therefrom by knife blade 321. At the completion of the coring operation cam 325 imparts movement to lever 327 so that the coring knife blade holder 322 is swung downwardly about the fulcrum provided by shaft 323, thereby lowering the coring knife blade 321 to the position shown in Figs. 9 and 29 in which the same is entirely withdrawn from the tomato.

Each discharge mechanism F comprises a plate 331 (Figs. 8 and 29) fixed to a bracket 332 (Fig. 32) having a bearing 333 rotatably mounted on rockshaft 323. Depending from the bearing 333 of bracket 332 is an arm 334 (Figs. 7 and 8) having pivotal connection by pin 335 with the slotted end 336 of an upwardly extending long arm 337 of a bell crank lever 338. The lever 338 is secured to a rod 339 providing a fulcrum for the lever and the rod 339 is mounted in bearings formed in the rearwardly extending arms 319 of bracket 316. A short arm 341 extending rearwardly from the fulcrum of bell crank lever 338 has a follower roller 342 mounted on its extremity and engaged with the periphery of a cam 343 fixedly mounted on shaft 52, between the two spaced arms 319 of brackets 316 (Fig. 6). A torsion spring 344 (Figs. 30 to 33) is coiled around an extended end of the rod 339 and has one end fixed to a collar 345 secured to the rod and its opposite end engaged under the arms 319 of bracket 316 to maintain follower roller 342 in engagement with the periphery of cam 343 (Fig. 8) at all times.

The tip-off plate 331 of the discharge mechanism is preferably formed from suitable sheet metal. The plate 331 (Figs. 29 and 32) has an end portion substantially of the shape of a hook 346 with an opening 347 arranged to clear the upper flanged portion 88 of the tube 86 (Fig. 10). The edge of the opening 347 of the plate 331 (Figs. 29 to 33) is cut out, as indicated at 348 to provide an opening through which the coring knife blade 321 can freely pass without contacting the plate 331. The tip of the hook 346 is spaced from the main body of the plate 331 a distance to provide a gap in the side of the plate having an area sufficient to accommodate the roller 281 of the peeler head 220 during downward and upward movements of the peeler head and during upward and downward movements of the tip-off or discharge plate (Figs. 31 to 33).

As shown in Figs. 7, 8, and 33, normally the discharge plate 331 is disposed in a substantially horizontal position overlying the upper portion of the spindle 80. When the plate 55 of the feed mechanism delivers a tomato to the top of the spindle 80, plate 55 overlies the discharge plate 331 and is spaced therefrom a distance sufficient to prevent rubbing contact between the two plates.

The manner in which arm 334 (Fig. 8) of the plate 331 is connected with the slotted end 336 of the bell crank 338 is such that a toggle action is provided by which the plate 331 is quickly tilted upwardly and then downwardly about the pivot provided by rockshaft 323 when the protuberance 349 of cam 343 engages follower roller 342. The plate 331 is tilted by its operating mechanism at the conclusion of the coring operation so as to doff the tomato in a manner as will be hereinafter more fully described.

*Operation*

The drive mechanism G, as hereinbefore explained, is set into motion by the electric motor 28 whereby the main drive shaft 26, auxiliary shaft 44 and the coring cam shaft 52 are rotated for driving the various operating mechanisms of the machine.

The starting position of the machine is illustrated in Figs. 2, 5, and 37 wherein the feed plates 55 are disposed in their extreme outermost position for the reception of tomatoes thereon. A tomato is placed on each plate 55, stem end down in engagement with the two upright pegs 55', while the feed mechanism A remains in its outermost position for approximately ⅔ of one cycle of operation, by reason of the uppermost dwell U in the cam 77 (Fig. 16), during which time operation of the peeling and coring devices takes place. Consequently, ample time is allowed for properly positioning the fruit on the feed plates 55 in the manner explained above.

After the foregoing ⅔ cycle and during the next ⅙ cycle of operation, the cam 77 effects a complete stroke of the link 74 (full to dotted line position Fig. 16) to thereby rock the feed mechanism F into the position shown in Figs. 6 and 38 so that the feed plates 55 are disposed above their associated pedestals 81. As the tomatoes are being transferred to a position above the pedestals 81, the gear shifting cam 156 (Figs. 14 and 15) is so disposed as to effect operation of the clutch 148 to rotate bevel gears 139, 140 thereby rotating the train of gears 131, 132, 133, 134 and their intermediate gear clutch elements 129 associated with the spindles 80 of the respective pedestals in the direction of the arrows 141—142 in Fig. 4.

The centering arms 181, 182 (Figs. 1, 3, and 7) are held in spaced apart position by the spring 215 and its associated mechanism 210, 206, 202 (Figs. 2, 3, 4 and 5) when the plate 55 delivers the tomato to the pedestal 81. Promptly thereafter, and during a dwell of plate 55 over the pedestal due to movement of the lowermost dwell of cam 77 past the roller 76 of the link 74 (Fig. 16), the roller 213 climbs the acclivity of cam 214 (Fig. 19) thereby releasing the centering arms 181, 182 for movement, by their torsion springs 201, toward the tomato (Figs. 2, 5, and 6). Consequently, while the tomato is still supported by the plate 55, the four centering rollers 186 close in on the tomato to orient and stabilize the same relative to the vertical axis of the spindle 80 as shown in Figure 38.

Also during the aforesaid dwell of the plate 55 above the spindle 80, the screw actuating cam 128 (Fig. 17) effects an operation of the lever arm 126 and rockshaft 117 to thereby impart upward movement to the screw actuating arms 116 and screw shafts 111 from the position shown in Figs. 8, 37 and 38 to the position shown in Figures 34 aand 39. It will be recalled that the gear 129 of the several spindles 80 are constantly rotated by their engagement with the gears 131, 132, 133, and 134 and, consequently, as the screw shaft 111 of each spindle rises, the rotating screw 112 thereon pierces the stem end of the centered tomato and winds its way up into the core of the tomato. When the screw approaches about half way its length into the tomato, the cam 77 of the feed mechanism effects withdrawal of the plate 55 from beneath the tomato which is still held between the centering rollers 186 as indicated in Figure 39.

Promptly following withdrawal of the plates 55 from above the spindles 80, the upper tube 86 of each spindle is elevated by the forked lever 95 associated therewith (Figs. 8 and 11) from full to dotted line position Fig. 12 whereupon the fins 89 at the upper end of each spindle are raised from the position shown in Figs. 34 and 39 to that of Figs 35 and 40 for impaling the fruit as close to the screw as possible. Although the screw actuating mechanism has completed its elevating stroke, it will be noted there is still a considerable space between the collar 114 and block 115 on the lower end of each spindle (Fig. 35) to permit further upward movement of the screw shaft. Consequently, since the screw shaft 111 is still rotating by engagement of its gear 129 with the adjacent gears 131, 132, 133, and/or 134, the tine of the screw 112 continues its serpentine path upwardly into the core of the tomato which is still being held by the centering rollers 186 and also by impaling fins.

It is, therefore, apparent that the remaining portion of the screw 112 is drawn upwardly into the core of the tomato by the effect of the tomato on the screw as indicated in Figure 41 and as the screw drives up into the relatively tough tomato core and presses the tomato against the flange 88 from which the fins 89 project, the screw shaft 111 is drawn upwardly beyond the complete elevating stroke of the block 115 and lever arm 116. In other words, the last mentioned rise of the screw shaft 111 from the position of Fig. 35 to that of Fig. 36 is only accomplished by reason of the presence of a tomato on the flange 88 and results in an elevation of the gear clutch element 129 which is secured to the screw shaft 111. The gear clutch 129 is thereby raised from the position shown in Fig. 35 to that of Fig. 36 wherein the clutch teeth 130 of gear clutch 129 engage the teeth of clutch collar 110 to thereby rotate the spindle and fins 89 in unison with the screw shaft 111 and screw 112 as indicated in Figure 41.

From the foregoing it is apparent that the radially disposed fins 89 effect a turning of the tomato in unison with the screw 112 so that the screw and tomato are now relatively static with respect to each other, i. e., the movement of the screw into the tomato now ceases and the tomato is securely perched against the flange 88 on top of the spindle 80 for rotation therewith.

Immediately prior to the engagement of the clutch teeth 130 with the teeth of collar 110, the roller 213 for operating the fruit centering devices C rolls off the acclivity of cam 214 from the position shown in Fig. 19 to that of Fig. 5. The lever 219 is thereby urged counterclockwise by action of the spring 215 to positively shift the rod 206 and loops 204 into the position shown in Fig. 3 for opening of the centering jaws 181, 182 against the action of their torsion springs 201 to thereby free the tomato for rotation with the spindle 80 as likewise illustrated in Figure 41.

As the centering jaws disengage the tomato and the latter begins to rotate, the cam 308 (Fig. 18) rotating with the main drive shaft 26 effects an initial descent of the roller 307 from the extreme upper dwell of cam 308 to the position shown in Fig. 18 to thereby partially lower the peeler actuating frame 226. The foregoing descent of the frame 226 lowers the peeler assembly into a position wherein the pinion 295 thereof begins to engage the first tooth of the rack bar 293 and the peeling roller 281 rests, under the tension of torsion spring 287, upon the blossom end of the tomato in the position shown in Figures 29 and 42.

The rotor 259 of each peeler head unit 220 is constantly driven by the air under pressure supplied by way of the manifold 313 and, consequently, the prickles provided by the pins 284 on the peeling roller 281 begin their abrading action immediately upon engagement of the tomato therewith. It will be remembered that the peeler assembly is sensitively balanced relative to its pivot pin 245 and that the spring 287 is so adjusted as to yieldingly maintain the peeling roller 281 adjacent the periphery of the tomato which is spinning with the spindle 80. Consequently, the peeling roller follows the contour of the rotating tomato and, since it is in substantial tangential contact therewith, there is no gouging action of the roller upon the skin of the fruit but rather an abrading of the skin layer thereof so as to remove nothing more than the skin of the fruit. Moreover, the roller 281, being in a substantial one point contact with the fruit, adapts itself to either recesses or protuberances on the fruit so as to ride into or onto the same, as the case may be, to assure removal of the skin from such irregular surfaces of the fruit.

As the frame 226 continues to descend by relative movement of the roller 307 from the position shown in Fig. 18 through the declivity of the cam 308, the pinion 295 is caused to travel over the rack bar 293 thereby rotating the peeler assembly counterclockwise (Figs. 29 to 31 and Figures 42 to 44) as it descends. It is, therefore, apparent that as the rotating roller 281 progresses through its 180° turn from the blossom end toward the stem end of a rotating tomato, the abrading effected in overlapping paths results in a complete removal of the skin from the tomato. It should be noted that at the beginning of the peeling operation the blossom end of the tomato is engaged by that portion of the peeling roller 281 closest to the rotor housing 248 as shown in Figures 29 and 42 and as the roller turns through its 180° arc, the point of contact between the tomato and roller gradually progresses lengthwise of the roller until in the final peeling position the portion of the roller remote from the housing 249 is in engagement with the tomato, as shown in Figures 31 and 44.

Since the movement of the peeling head unit 220 through the path illustrated in Figs. 29, 30, and 31 and Figs. 42, 43, and 44 is rather rapid and the sensitivity of the spring 287 is such as to merely maintain the peeler roller 281 of the balanced peeler assembly in contact with the rotating tomato, it is apparent that the skin layer of the tomato is subjected to the abrading effect of the pins 284 no more than is necessary to remove the skin from the fruit. In other words, once the protective coat of skin is removed from the fruit the relatively soft and sensitive fibre structure just beneath the skin of the fruit is not disturbed.

However, when the peeler head 220 completes its travel around one side of the tomato and arrives at the position shown in Figures 31 and 44, the pins 284 of roller 281 do have a repeated action upon the tougher layer of skin and pulp which usually surrounds the stem end of the fruit. This prolonged action of the peeling roller adjacent the stem end of the fruit is caused by the substantial dwell $d$ in the cam 308 following the aforementioned gradual declivity thereof which had effected lowering of the peeling assembly as previously explained.

By reason of the aforementioned prolonged peeling operation, a sufficient portion of the relatively unripened skin and pulp adjacent the stem cavity of the fruit is worn away by the pins 284 to expose more mature pulp of the fruit, it being noted that the extreme end of the peeling roller 281 is as close to the core of the fuit as is permissible by the size of the collar 88 on the spindle 80 so as to remove the skin as close as possible thereto.

After substantially one-half to three-quarters the time allowed for the final peeling operation stated above, the coring knife 321 is elevated by rocking of the knife blade holder 322 and lever 327 with the rockshaft 323 as effected by the coring cam 325 and shaft 52 (Figs. 9 and 31). The foregoing operation of the coring knife 321 is so timed as to pierce and enter the tomato just prior to the completion of the final peeling operation as illustrated in Figure 45 so that the core is still substantially attached to the fruit during the final stage of peeling.

Promptly following the completion of the entire peeling operation, the peeling assembly is caused to be lowered still further to the position shown in Figures 32 and 46 by reason of descent of the peeler actuating frame 226 as effected by relative movement of the roller 307 into the lowermost recess L in the cam track 308 (Fig. 18). During the foregoing recession of the peeler roller 281 relative to the tomato, the final fraction of a revolution of the spindle 80 causes the core of the tomato to be completely circumscribed, relatively speaking, by the knife blade 321 thereby completely severing the core from the tomato.

It should be noted that the coring knife 321 is so constructed as to form an arc of a circle scribed about the rockshaft 323 and that the length of the knife blade holder 322 forms a radius for such arc so as to support the knife in a position just adjacent but not touching the fins 89 and screw 112 (Fig. 32). Consequently, as the knife is moved upwardly it enters the tomato just outside the final annular path of the peeling roller over the tomato, i. e., in the peeled area of the tomato, and cuts a cone shaped plug of core from the tomato immediately adjacent the screw and fins as indicated in Figure 46. The cut made by the knife 321 is well within the core region of the fruit leaving a sufficient wall between the cut out, i. e., the recess created by severance of the core, and the seed cells of the fruit so that the seed cell sections thereof are not disturbed, the fruit, therefore, remaining substantially as firm as it was in its uncored condition.

As soon as the core is severed from the tomato, the coring knife is withdrawn, the discharge mechanism F is operated followed by removal of the core, the three operations occurring almost simultaneously except for a sufficient lag in their commencement as to prevent fouling of their several instrumentalities (Figures 47 and 48).

Referring now to Fig. 7, it will be noted that the knife operating cam 325 first effects lowering of the roller 326 associated therewith into the lower portion of the cam track and as soon as this occurs the protuberance 349 on the discharge cam 343 rocks the bell crank 338 to tilt the discharge plate 331 into the position shown in Figures 32 and 47. The tomato being freed from its core, is, therefore, caused to slide easily down the inclined plate 331 for gentle deposit into a suitable receptacle, preferably a moving conveyor belt (not shown) passing beneath the coring cam shaft 52.

In the meantime, it will be noted that the gear shifting cam 156 (Figs. 14 and 15) effects axial movement of the rod 159 against the action of the spring 162 associated therewith whereupon the gear shifting lever 164 shifts the clutch sleeve 148 out of engagement with the clutch teeth 146 on the bushing 144 of the bevel gear 130 and into driving engagement with the teeth 151 on the bushing 152 of the reversing gear 153. In this manner, reversed rotation of all of the gears 131, 132, 133, and 134 is effected with a resultant reversal of the tubular screw shafts 111 and screws 112 as well as the spindles 80 and fins 81. However, since the teeth of the gear clutch 129 and collar 110 are disposed to disengage under reversal thereof, it is apparent that the screw 112, now turning in a reverse direction, is caused to wend its way out of the core plug and to lower away therefrom as the screw shaft 111 is lowered by action of the lever arms 116 as effected by the rockshaft 117, arm and roller 126, 127, and acclivity of cam 128 (Fig. 17). Since the clutch 110—130 between the shaft 111 and tube 85 is thus disengaged, the fins hold the plug of tomato core now relatively stationary due to substantial friction between the spindle and its bearings 83, 84.

As the last convolutions of the screw tine 112 begin their final turns out of the core, the knockout rod 170 is kicked upwardly by action of the lever 173 (Fig. 8) and rockshaft 174 due to the effect of the roller 176 of the arm 175 (Fig. 20) as it quickly rides up and over the tooth 180 on the coring cam 177. Consequently, the rod 170 projects upwardly through the convolutions of the screw 112 imparting a sudden jab of the rounded upper end of rod 170 against the now freed core causing the latter to be knocked off the fins 89 (Figure 48) whereupon the displaced core will fall to one side of the pedestal 81. The discharge plate 331 and knock-out rod 170 descend by their own weight as their respective cams 343 and 177 release their actuating levers for return to normal position and the fins 89 return to their initial position below the level of the discharge plate 331 under the influence of the control cam 106 establishing conditions such as illustrated in Figure 49 which are identical with the initial position of the various tomato processing implements as illustrated in Figure 37.

During the foregoing return of the discharge plate to normal position, the peeler actuating frame 226 is again elevated by action of the roller 307 in the acclivity of the cam 308 (Fig. 18) thereby quickly returning the peeling assembly to its fully raised position as shown in Figs. 7, 37, and 49. The feed mechanism A, the feed plates 55 of which in the interim have each been supplied with another tomato in a manner as previously explained, is again actuated by its cam 77 (Fig. 16) to dispose the tomatoes of the next batch thereof above their respective pedestals. The gear shifting cam 156, in the meantime, has released the gear shifting mechanism 159, 164, 148 for return, by its compression spring 162, to the position shown in Figs. 14 and 15 for rotating the various screw shafts 111 in a direction to drive the screws 112 into the next tomatoes presented to the same. Thereupon, the foregoing cycle of operation is repeated in the same sequence as described herein.

While I have described a particular embodiment of the present invention, it will be understood that various changes and modifications may be made without departing from the spirit of the present invention and the scope of the appended claims.

What I claim as new and desire to protect by Letters Patent is:

1. A tomato preparation machine including a rotatable member adapted to support a tomato thereon, a screw associated with said rotatable member, means operable to rotate said screw, means operable to move the screw rectilinearly with respect to said rotatable member into the tomato supported thereon, and means supported by said screw and arranged to engage said rotatable member upon movement of said screw a predetermined distance into the tomato for rotating said rotatable member in unison with said screw.

2. A fruit supporting mechanism for tomato preparation machines comprising a spindle adapted to receive the fruit stem end first, means on said spindle effective to engage a fruit received thereby to rotate the same therewith, a screw in said spindle movable coaxially of the same into the core of the fruit, means operable to rotate the screw relative to the spindle for advancing the screw into the core of the fruit, and means connected to and movable with said screw as it advances into the core of the fruit for engaging the spindle to turn the same in unison with the screw to thereby rotate the fruit and stay further advancement of the screw into the fruit.

3. In a machine for preparing tomatoes for processing, a fruit supporting spindle comprising a pedestal, a tubular member supported for rotation in the base of said pedestal, a sliding tubular member rotatably supported in the free end of said pedestal for extension and retraction relative thereto, a shaft rotatably supported coaxially of said tubular members and movable rectilinearly thereof, said sliding tubular member having radially disposed fins adapted to impale a fruit presented to said pedestal, a spiral screw secured to one end of said shaft normally disposed in the region of said fruit impaling fins, a clutch element secured adjacent the opposite end of said shaft, clutch means secured to the tubular member at the base of said pedestal for driving engagement with said clutch element, means for momentarily holding a fruit in a predetermined position on the free end of said pedestal, means for shifting the sliding tubular member toward the fruit for impaling the same on said radially disposed fins, means for initially shifting said shaft toward the fruit for engaging the spiral screw into the same whereby said screw will advance during rotation thereof relative to said fruit to thereby effect engagement of said clutch element with said clutch means after the screw has advanced a predetermined distance into the fruit, and means providing sliding driving connection between said tubular members whereby the latter rotate in unison when said clutch element and clutch means drivingly engage each other to thereby rotate the fruit impaled on said fins at the same speed as the screw for staying further advancement of the screw into the fruit.

4. In a tomato preparing machine having means effective to peel a tomato when the tomato is turned about its main axis, a tomato holding mechanism comprising a rotatable carrier having tomato impaling means, a screw rotatably mounted adjacent said carrier, means operable to twist the screw into the core portion of a tomato presented thereto and impale said core portion upon the said impaling means, means operable to rotate the carrier and the screw at the same speed, with the surface of the impaled tomato in contact with said peeling means, means effective upon completion of said peeling operation to sever the impaled core portion of the peeled tomato to thereby release the tomato from said carrier, and means operable upon completion of said core severing operation to turn said screw in a manner adapted to wind it out of said core portion.

5. In a tomato preparing machine mechanism for holding and turning a tomato during preparation thereof comprising a rotatable tubular member having a plurality of fins projecting from the free end thereof adapted to engage the stem end of a tomato, means operable to feed a tomato stem end first toward said tubular member, a rotatable screw movable within and coaxially with said tubular member for engaging the stem end of the tomato to enter the same, means operable to rotate said screw, means operable to move the tubular member toward the tomato subsequent to entrance of the screw a predetermined distance into the same for embedding the fins of said tubular member within the core portion of the tomato, and means operable subsequent to entrance of said fins into the core portion of the tomato to rotate said tubular member in unison with said screw to effect rotation of the tomato.

6. In a tomato preparing machine having means effective to remove the skin of a tomato when the tomato is turned about its main axis, a holding mechanism comprising a tubular member having a plurality of fins projecting from the free end thereof and adapted to engage the stem end of a tomato presented thereto, means operable to feed a tomato stem end first toward said tubular member, a rotatable screw movable within and coaxially with said tubular member in a manner adapted to engage the stem end of the tomato, means operable to rotate said screw in a manner adapted to twist it into the stem end of the tomato, means operable to move the tubular member toward the tomato subsequent to entrance of the screw a predetermined distance into the tomato for embedding the fins of said tubular member within the core portion of the tomato, means operable subsequent to entrance of said fins to the core portion of the tomato to rotate the tubular member in unison with the screw so as to rotate the tomato seated thereon about its main axis with its surface in contact with the skin removing means, a coring knife arranged to move into rotating tomato exteriorly adjacent to said fins, means operable upon completion of the skin removing operation to move said knife into the rotating tomato for relatively circumscribing the core portion thereof along a conical surface enclosing said fins and thus release the skinned tomato from said tubular member, means operable upon completion of the core severing operation to remove the released tomato from the tubular member, means likewise operable upon completion of said core severing operation to retract said screw from the tomato, and means operable coincident with said last mentioned operation to engage the core portion of the tomato for detaching the severed core portion from said screw and tubular member.

7. In a tomato preparing machine mechanism for holding the tomato comprising a rotatable spindle, means operable to rotate said spindle, impaling means associated with said spindle and adapted to engage the core portion of a tomato presented thereto to thus secure the tomato to said spindle for rotation therewith, a curved coring knife adapted to accommodate said impaling means within the concave side of its arc and normally disposed adjacent said spindle below the level of said impaling means, and means operable coincident with said spindle rotating means to elevate said knife into the tomato during rotation thereof for severing a conical core portion containing said impaling means from the tomato.

8. In an apparatus for preparing tomatoes or the like for processing, a tomato holding mechanism comprising a rotating spindle, impaling means associated with said spindle and movable with respect thereto, said impaling means being adapted to engage the core portion of a tomato presented thereto stem end first to secure the tomato to said spindle for rotation therewith about its stem blossom axis, an arcuate knife blade movable into the rotating tomato and adapted when within the tomato to sever a conical portion containing said impaling means therefrom, means operable to move said knife blade into the tomato to release the tomato from said spindle, means operable upon completion of the severing operation to discharge the cored tomato from said spindle, and means likewise operable upon completion of said severing operation to withdraw the impaling means from the severed portion of the tomato.

9. In a tomato preparing machine the combination of a rotatable tube having means thereon for impaling a tomato from the stem end thereof, a tomato support movable back and forth into and out of alignment with said tube for receiving tomatoes and delivering the same stem end first to said tube, said tomato support being arranged to straddle the tube to position the tomato in centered relation thereon, with a screw disposed coaxially with said tube and means operable to rotate said screw and move it into the core of the tomato in a manner adapted to secure the tomato in centered relation upon the impaling means of said rotatable tube.

10. In a tomato preparation machine the combination of a rotatable tube having means thereon for impaling a tomato from the stem end thereof with a screw disposed coaxially with said tube, means operable to rotate said screw and move the same into the core of the tomato in a manner adapted to secure the tomato in centered relation upon said impaling means, and means effective to establish a driving connection between said screw and said tube when said screw has advanced a predetermined distance into the tomato, to rotate the tomato with the screw.

11. In a fruit preparation machine a fruit holding mechanism comprising a spindle, a rotatable fruit support on said spindle having fins adapted to impale a fruit presented thereto, means operable to present a fruit stem-end first to said spindle, a screw movable within and relative to said fruit support, means operable to move said screw into the core of a fruit presented to said fruit support, means operable coincident with the advancement of said screw into the fruit to move said fruit support toward the fruit for impaling the same on said fins, means operable upon impalement of the fruit on said fins to rotate the screw with respect to the fruit to advance said screw into the core of the fruit, means effective upon advancement of said screw a predetermined distance into the fruit to rotate said support in unison with the screw for rotating the fruit impaled upon said support, and means subsequently operable to reverse the direction of rotation of said screw for retracting the same from the fruit into the fruit support.

12. A tomato coring mechanism comprising a rotatable spindle for supporting a tomato from beneath with its stem end core portion lowermost and having means for rotating the spindle, impaling means rotatable with said spindle and adapted to enter a tomato from the stem end to engage the tomato core portion to secure the tomato to said spindle for rotation therewith, core penetrating means extending laterally from the axis of said spindle and on the same side of the tomato as the impaling means for retaining the tomato on the spindle, a coring knife movably mounted adjacent said spindle on the same side of the tomato as said impaling means, said knife being projectable at an angle toward the axis of the spindle, and means operable coincident with rotation of the tomato by said spindle rotating means to elevate said knife into the tomato from the stem end thereof for severing the core portion containing said impaling means from the tomato.

BURTON C. COONS.

References Cited in the file of this patent
UNITED STATES PATENTS

| Number | Name | Date |
|---|---|---|
| 140,315 | Steward | June 24, 1873 |
| 382,549 | Oaks | May 8, 1888 |
| 482,493 | Zastrow | Sept. 13, 1892 |
| 899,340 | Simpson | Sept. 22, 1908 |
| 1,246,127 | Luther | Nov. 13, 1917 |
| 1,256,751 | Wentzel | Feb. 19, 1918 |
| 1,347,385 | Kirino | July 20, 1920 |
| 1,399,969 | Kurkjian | Dec. 13, 1921 |

(Other references on following page)

UNITED STATES PATENTS

| Number | Name | Date |
|---|---|---|
| 1,583,100 | Reynolds | May 4, 1926 |
| 1,714,313 | Meisler | May 21, 1929 |
| 1,726,722 | Sleeper | Sept. 3, 1929 |
| 1,727,376 | Mehersle | Sept. 10, 1929 |
| 1,815,730 | Chapman et al. | July 21, 1931 |
| 1,820,351 | Duncan | Aug. 25, 1931 |
| 1,823,854 | Coons | Sept. 15, 1931 |
| 1,951,804 | MacDougall | Mar. 20, 1934 |
| 2,056,413 | Thompson | Oct. 6, 1936 |
| 2,056,843 | Erro | Oct. 6, 1936 |
| 2,178,007 | Thompson | Oct. 31, 1939 |
| 2,187,075 | Coons | Jan. 16, 1940 |
| 2,266,748 | Ewald | Dec. 23, 1941 |
| 2,447,640 | Dunn | Aug. 24, 1948 |
| 2,459,368 | Dunn | Jan. 18, 1949 |

FOREIGN PATENTS

| Number | Country | Date |
|---|---|---|
| 270,093 | Germany | Feb. 5, 1914 |
| 700,168 | Germany | Dec. 14, 1940 |
| 545,497 | Great Britain | May 29, 1942 |